(12) United States Patent
Xue et al.

(10) Patent No.: US 12,302,054 B2
(45) Date of Patent: May 13, 2025

(54) EAR-WORN ELECTRONIC DEVICE INCORPORATING GESTURE CONTROL SYSTEM USING FREQUENCY-HOPPING SPREAD SPECTRUM TRANSMISSION

(71) Applicant: Starkey Laboratories, Inc., Eden Prairie, MN (US)

(72) Inventors: Dong Xue, Bloomington, MN (US); Zhenchao Yang, Eden Prairie, MN (US); Gregory J. Haubrich, Champlin, MN (US); Stephen Paul Flood, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 393 days.

(21) Appl. No.: 17/553,710

(22) Filed: Dec. 16, 2021

(65) Prior Publication Data
US 2022/0109925 A1    Apr. 7, 2022

Related U.S. Application Data

(63) Continuation of application No. PCT/US2020/041951, filed on Jul. 14, 2020.
(Continued)

(51) Int. Cl.
*H04R 1/10* (2006.01)
*G06F 3/01* (2006.01)
(Continued)

(52) U.S. Cl.
CPC ........... *H04R 1/1041* (2013.01); *G06F 3/017* (2013.01); *H04B 1/713* (2013.01); *H01Q 1/273* (2013.01)

(58) Field of Classification Search
CPC ........ H04R 1/10; H04R 1/1041; H04R 25/55; H04R 25/558; H04R 2225/51; G06F 3/017; H04B 1/713; H01Q 1/273
(Continued)

(56) References Cited

U.S. PATENT DOCUMENTS 7,764,798 B1    7/2010  Prather
7,843,425 B2    11/2010 Lu et al.
(Continued)

FOREIGN PATENT DOCUMENTS

EP          2731356         5/2014
EP          3508877         7/2019
WO       WO 2015/054419    4/2015

OTHER PUBLICATIONS

International Search Report and Written Opinion from PCT Application No. PCT/US2020/041951 dated Nov. 3, 2020, 13 pages.
(Continued)

*Primary Examiner* — Antim G Shah
*Assistant Examiner* — Sabrina Diaz
(74) *Attorney, Agent, or Firm* — Mueting Raasch Group

(57) ABSTRACT

An ear-worn electronic device is configured to be worn by a wearer and comprises a wireless transceiver operably coupled to an antenna. The device is configured to transmit, from the transceiver to the antenna, signals at a plurality of different frequencies in accordance with a frequency hopping sequence. The device is configured collect two-dimensional (2-D) reflection coefficient data comprising a reflection coefficient of the antenna as a function of frequency and of time in response to transmission of the signals. The device is configured to detect a particular input gesture of a plurality of input gestures of the wearer using the 2-D reflection
(Continued)

coefficient data, and implement a predetermined function of the ear-worn electronic device in response to detecting the particular input gesture.

24 Claims, 13 Drawing Sheets

Related U.S. Application Data

(60) Provisional application No. 62/875,139, filed on Jul. 17, 2019.

(51) Int. Cl.
  *H04B 1/713* (2011.01)
  *H01Q 1/27* (2006.01)

(58) Field of Classification Search
  USPC .................................................. 381/74, 315
  See application file for complete search history.

(56) References Cited

U.S. PATENT DOCUMENTS

| | | | |
|---|---|---|---|
| 8,655,000 B1 | 2/2014 | Solum et al. | |
| 9,575,560 B2 | 2/2017 | Poupyrev et al. | |
| 2007/0149146 A1 | 6/2007 | Hwang et al. | |
| 2012/0001875 A1 | 1/2012 | Li | |
| 2012/0007692 A1* | 1/2012 | Song | H03H 7/40 333/17.3 |
| 2012/0121095 A1 | 5/2012 | Popovski | |
| 2015/0242024 A1* | 8/2015 | Majava | G06F 3/046 345/174 |
| 2016/0080888 A1 | 3/2016 | Kreitzer | |
| 2016/0100801 A1 | 8/2016 | Clark | |
| 2016/0259421 A1* | 9/2016 | Gollakota | G06F 3/017 |
| 2017/0060269 A1* | 3/2017 | Förstner | G06F 3/0346 |
| 2017/0360323 A1* | 12/2017 | Li | G01N 22/00 |
| 2018/0157330 A1* | 6/2018 | Gu | G01S 7/415 |
| 2019/0110140 A1 | 4/2019 | Dickmann | |
| 2019/0208456 A1 | 7/2019 | Mofidi et al. | |
| 2019/0212436 A1* | 7/2019 | Baheti | H01Q 1/2283 |
| 2019/0243458 A1* | 8/2019 | Wang | G06F 18/2155 |
| 2021/0133399 A1 | 5/2021 | Coelho De Souza | |
| 2022/0109925 A1 | 4/2022 | Xue | |
| 2022/0217464 A1 | 7/2022 | Xue | |

OTHER PUBLICATIONS

Abdeinasser, 2025, "WiGest: A Ubiquitous Wifi-based Gesture recognition System" arXiv: 1501.04301v2, May 18, 2015, 10 pages.

International Patent Application No. PCT/US2020/057519, filed Oct. 27, 2020; International Search Report / Written Opinion issued Feb. 15, 2021; 10 pages.

International Patent Application No. PCT/US2020/057519, filed Oct. 27, 2020; International Preliminary Report on Patentability issued May 17, 2022; 8 pages.

International Patent Application No. PCT/US2020/041951, filed Jul. 14, 2020; International Search Report and Written Opinion issued Nov. 3, 2020; 13 pages.

* cited by examiner

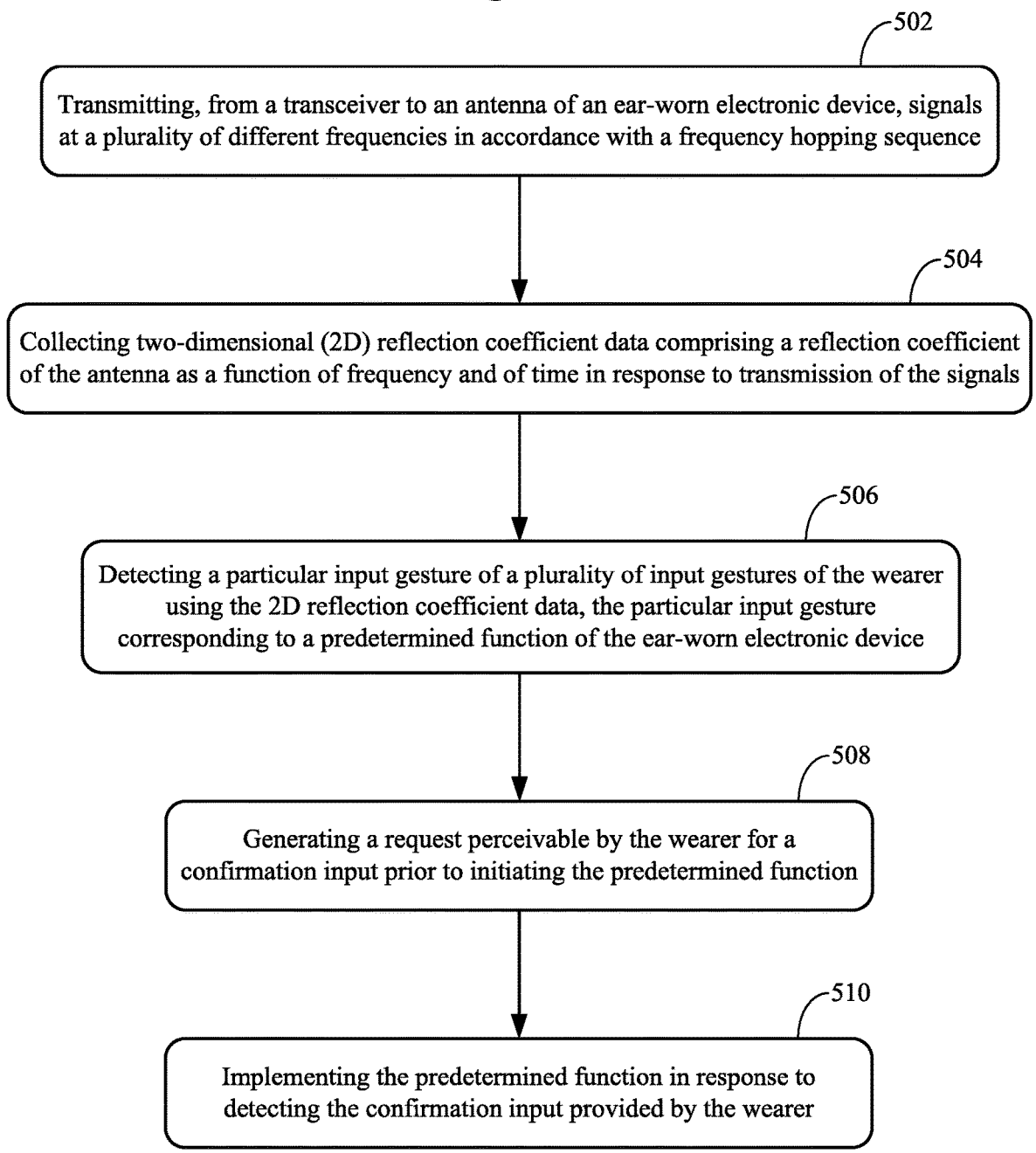

EAR-WORN ELECTRONIC DEVICE INCORPORATING GESTURE CONTROL SYSTEM USING FREQUENCY-HOPPING SPREAD SPECTRUM TRANSMISSION

RELATED APPLICATIONS

This application is a continuation of PCT Application No. PCT/US2020/041951, filed Jul. 14, 2020, which claims priority to U.S. Provisional Application No. 62/875,139, filed Jul. 17, 2019, the content of which are hereby incorporated by reference in their entireties.

TECHNICAL FIELD

This application relates generally to ear-worn electronic devices and/or accessories for ear-worn devices, including hearing devices, hearing aids, personal amplification devices, other hearables, smartphones, smart watches, and fitness and/or health monitoring watches.

BACKGROUND

Hearing devices provide sound for the wearer. Some examples of hearing devices are headsets, hearing aids, speakers, cochlear implants, bone conduction devices, and personal listening devices. For example, hearing aids provide amplification to compensate for hearing loss by transmitting amplified sounds to a wearer's ear canals. Hearing devices may be capable of performing wireless communication with other devices, such as receiving streaming audio from a streaming device via a wireless link. Wireless communication may also be performed for programming the hearing device and transmitting information from the hearing device. For performing such wireless communication, hearing devices such as hearing aids can include a wireless transceiver and an antenna.

SUMMARY

Embodiments are directed to an ear-worn electronic device configured to be worn by a wearer and comprising a housing configured to be supported in, on or about the wearer's ear. A processor is coupled to memory, and the processor and memory are disposed in the housing. A speaker or a receiver is operably coupled to the processor. A radio frequency transceiver is disposed in the housing and operably coupled to the processor. An antenna is disposed in, on, or extends from the housing and operably coupled to the transceiver. Circuitry is coupled to the antenna, transceiver, and processor. The circuitry is configured to measure a reflection coefficient of the antenna. The processor is configured to cooperate with the transceiver, antenna, and circuitry to transmit signals at a plurality of different frequencies to the antenna in accordance with a frequency hopping sequence, collect two-dimensional (2-D) reflection coefficient data comprising the reflection coefficient of the antenna as a function of frequency and of time in response to transmission of the signals, detect a particular input gesture of a plurality of input gestures of the wearer using the 2-D reflection coefficient data, and implement a predetermined function of the ear-worn electronic device in response to detecting the particular input gesture.

Embodiments are directed to a method implemented by an ear-worn electronic device configured to be worn by a wearer and comprising a wireless transceiver operably coupled to an antenna. The method comprises transmitting, from the transceiver to the antenna, signals at a plurality of different frequencies in accordance with a frequency hopping sequence. The method comprises collecting two-dimensional (2-D) reflection coefficient data comprising a reflection coefficient of the antenna as a function of frequency and of time in response to transmission of the signals. The method also comprises detecting a particular input gesture of a plurality of input gestures of the wearer using the 2-D reflection coefficient data, and implementing a predetermined function of the ear-worn electronic device in response to detecting the particular input gesture.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 5 illustrates a gesture control method using FHSS transmission implemented by an ear-worn electronic device in accordance with any of the embodiments disclosed herein;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
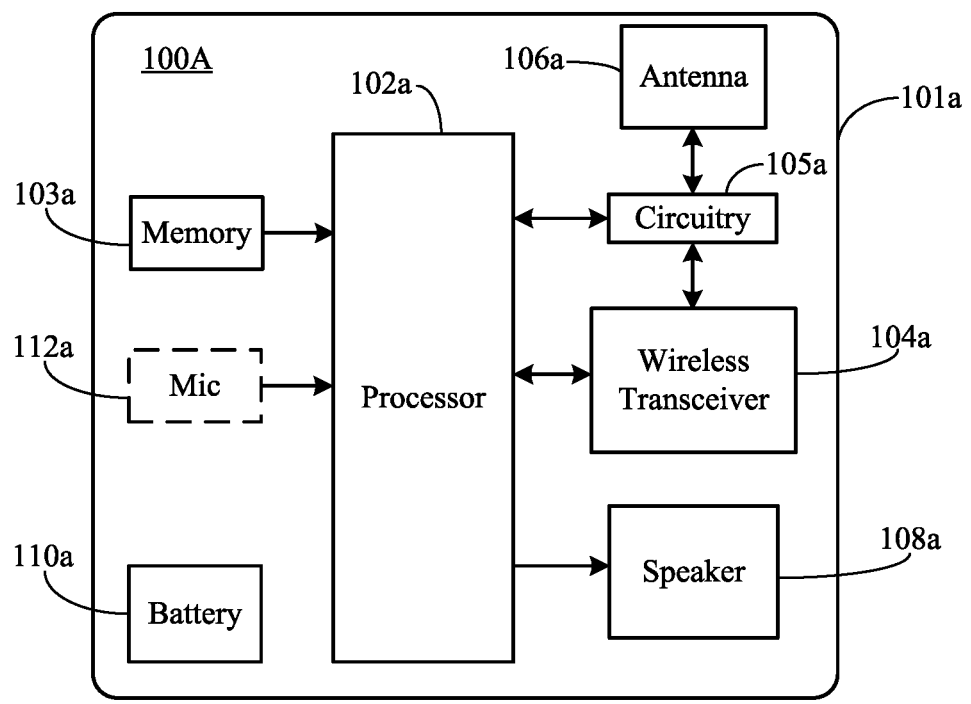
FIGS. 1A and 1B illustrate an ear-worn electronic device arrangement incorporating a gesture detection and device control system in accordance with any of the embodiments disclosed herein.

It is understood that the embodiments described herein may be used with any ear-worn or ear-level electronic device without departing from the scope of this disclosure. The devices depicted in the figures are intended to demonstrate the subject matter, but not in a limited, exhaustive, or exclusive sense. Ear-worn electronic devices (also referred to herein as "hearing devices"), such as hearables (e.g., wearable earphones, ear monitors, and earbuds), hearing aids, hearing instruments, and hearing assistance devices, typically include an enclosure, such as a housing or shell, within which internal components are disposed. Typical components of a hearing device can include a processor (e.g., a digital signal processor or DSP), memory circuitry, power management circuitry, one or more communication devices (e.g., a radio, a near-field magnetic induction (NFMI) device), one or more antennas, one or more microphones, and a receiver/speaker, for example. Hearing devices can incorporate a long-range communication device, such as a Bluetooth® transceiver or other type of radio frequency (RF) transceiver. A communication device (e.g., a radio or NFMI device) of a hearing device can be configured to facilitate communication between a left ear device and a right ear device of the hearing device.

Hearing devices of the present disclosure can incorporate an antenna coupled to a high-frequency transceiver, such as a 2.4 GHz radio. The RF transceiver can conform to an IEEE 802.11 (e.g., WiFi®) or Bluetooth® (e.g., BLE, Bluetooth® 4. 2 or 5.0) specification, for example. It is understood that hearing devices of the present disclosure can employ other transceivers or radios, such as a 900 MHz radio. Hearing devices of the present disclosure can be configured to receive streaming audio (e.g., digital audio data or files) from an electronic or digital source. Representative electronic/digital sources (e.g., accessory devices) include an assistive listening system, a TV streamer, a radio, a smartphone, a laptop, a cell phone/entertainment device (CPED) or other electronic device that serves as a source of digital audio data or other types of data files. Hearing devices of the present disclosure can be configured to effect bi-directional communication (e.g., wireless communication) of data with an external source, such as a remote server via the Internet or other communication infrastructure. Hearing devices that include a left ear device and a right ear device can be configured to effect bi-directional communication (e.g., wireless communication) therebetween, so as to implement ear-to-ear communication between the left and right ear devices.

The term hearing device of the present disclosure refers to a wide variety of ear-level electronic devices that can aid a person with impaired hearing. The term hearing device also refers to a wide variety of devices that can produce processed sound for persons with normal hearing. Hearing devices of the present disclosure include hearables (e.g., wearable earphones, headphones, earbuds, virtual reality headsets), hearing aids (e.g., hearing instruments), cochlear implants, and bone-conduction devices, for example. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device," which is understood to refer to a system comprising a single left ear device, a single right ear device, or a combination of a left ear device and a right ear device.

Monitoring of human body motions and intuitive user control interfaces attract great interest in hearing devices. Currently, inertial measurement sensors (IMUs) are used for motion detection, and touch sensing technologies (e.g., Infrared Receiver—IR sensor) are widely used for human-computer user control interfaces. However, these sensors add space, cost, power consumption, and design complexity to hearing devices. For current implementations of hearing device user interfaces, not only switches or touch-sensors are needed, but also remote controls or apps are required. These can be costly and add hardware/software complexity. It is challenging to make discreet user adjustment for a hearing device. Typically, a push-button on the hearing device, a remote control, or a smartphone app is required. Since these are often quite noticeable to others, a more discreet method of adjustment is desirable.

In general, it is necessary that the antenna of a hearing device be in a small form factor in order to fit within the hearing device housing and/or accessories. The bandwidth of the antenna becomes narrower due to the smaller electrical size. This increases the challenge of attaining good matching for achieving maximum antenna efficiency (e.g., maximum total radiated power or TRP). Hearing devices that utilize a Bluetooth® protocol have additional challenges, since the frequency hops rapidly in accordance with a frequency hopping sequence. As the frequency hops, the antenna impedance changes.

Low-profile, miniaturized antennas are commonly used in hearing devices, such as hearing aids in particular. Typically, the antenna is a narrowband antenna due to the small electrical size. Frequency de-tuning is highly possible when the antenna is placed on the human body. This becomes more challenging for Bluetooth® implementations due to the frequency hopping characteristic. At the same time, however, a narrow bandwidth antenna has a strong surrounding electrical field (or magnetic field in the case of a magnetic antenna, such as an inductive loop antenna), which is exploited by gesture control systems of the present disclosure. This strong electric or magnetic field surrounding the antenna provides for more sensitive detection of hand, finger, and head gestures made by the hearing device wearer.

According to any of the embodiments disclosed herein, an FHSS system can be incorporated in a hearing device to provide a method for detecting gestures made by the hearing device wearer. Such gestures correspond to user inputs to the hearing device, including command inputs, setting inputs, function selection inputs, function deselection inputs, verification inputs, etc. An FHSS system incorporated in a hearing device can also provide a method for automatically tuning the antenna matching. In these and other implementations, a training system can be implemented to determine the reflection coefficient signal pattern or signature of the antenna for each gesture that corresponds to a hearing device user input.

A single antenna of a hearing device can be used to classify wearer gestures, such as hand or finger motions made in proximity to the hearing device. As the wearer's hand or finger moves, the electrical field or magnetic field of the antenna is perturbed. As a result, the antenna input impedance is changed. It is noted that the antenna and/or gesture detection circuitry can be placed in a left hearing device, a right hearing device or both left and right hearing devices for purposes of detecting wearer gestures. When a wearer performs hand or finger motions (e.g. waving, swipe, tap, holds, zoom, circular movements, etc.), an antenna impedance monitor records the reflection coefficients of the signals or impedance. As the wearer's hand or finger moves, the changes in antenna impedance show unique patterns due to the perturbation of the antenna's electrical field or magnetic field.

According to any of the embodiments disclosed herein, the patterns of a wearer gesture consist of two-dimensional (2-D) S11 signals, in both time domain and frequency domain, that is, S11 vs. frequency and S11 vs. time (also referred to herein as 2-D reflection coefficient data). A gesture control system of the hearing device processes, analyzes, and monitors the 2-D reflection coefficient data to detect wearer gestures. After detecting (and optionally verifying) a wearer gesture, the gesture control system informs a processor of the hearing device that an input gesture has been received. In response, the processor can implement a particular hearing device function or setting that corresponds to the detected input gesture.

For example, the hearing device processor monitors 2-D reflection coefficient data to detect a wearer gesture that corresponds to one of a multiplicity of reference gestures developed for the wearer and/or for a population. The reference gestures can be stored in a memory of the hearing device and/or in cloud storage. After the 2-D S11 signals are collected by the hearing device, time-frequency analysis can be performed by the hearing device processor to analyze the feature differences between each wearer gesture. For example, a time-frequency spectrogram can be generated and analyzed by the hearing device processor to detect a wearer gesture. The time-frequency spectrogram can be a two-dimensional figure describing the frequency spectrum variation of the 2-D S11 signals with time. Several signal processing techniques can be applied, including a Fast Fourier transform (FFT) and a continuous wavelet transform (CWT).

A gesture control system of a hearing device implemented in accordance with any of the embodiments disclosed herein is configured to collect and process two-dimensional (2-D) reflection coefficient data (e.g., S11 signals) in both time domain and frequency domain. By gathering S11 signals in both time domain and frequency domain, the gesture information detected by the hearing device is significantly more reliable than conventional gesture detection approaches. Collecting and processing two-dimensional (2-D) reflection coefficient data (e.g., S11 signals) in both time domain and frequency domain by a gesture control system according to any of the embodiments disclosed herein significantly increases gesture detection accuracy and significantly reduces gesture detection challenges due to frequency-hopping variations.

When a hand or finger of the wearer (or other individual) moves near the hearing device, it is not necessary that the hand or finger touch the hearing device since the electromagnetic wave travels wirelessly. As a practical matter, the wearer's hand or finger would not directly touch the antenna since the antenna is typically packed and sealed within the hearing device. As the wearer's hand or finger moves closer to the hearing device, a large perturbation of the antenna's electrical field occurs, resulting in a corresponding larger variation in the antenna's reflection coefficients (S11/S22) and impedance. Within a certain distance between the hand/finger and hearing device, as long as the wearer is performing a specific motion, the pattern of the reflection coefficient signals should be consistent, although the absolute value would likely be different due to signal decay along the distance. This non-contacting gesture detection method has a great advantage over a touch sensor since the wearer's hand/finger does not necessarily need to touch the hearing device to interact with the device. It is noted that wearer head shaking or nodding motions can also be monitored using a single antenna's reflection coefficient data.

As discussed previously, 2-D reflection coefficient data can be collected to characterize (e.g., develop signatures for) a multiplicity of gestures for one or more populations. The 2-D reflection coefficient signatures can be developed for a multiplicity of finger, hand, and head motions for an individual wearer, one or more populations, or a combination of an individual wearer and one or more populations. Each of these 2-D reflection coefficient signatures serves as a reference signal or reference signature (e.g., reference 2-D coefficient data). Each reference 2-D reflection signature corresponds to a particular input gesture of a multiplicity of input gestures that can be detected by the hearing device processor. The reference 2-D coefficient data can be pre-selected and stored in a memory of the hearing device and/or in cloud storage accessible by the hearing device. The collected 2-D reflection coefficient data can be post-processed using learning algorithms or statistical modeling. The trained data can then be compared with the reference 2-D reflection signature to determine whether or not event triggering is implemented (see, e.g., the methodology illustrated in FIG. 4).

A correlation or pattern recognition methodology can be implemented by the processor of the hearing device when comparing a detected gesture to a reference gesture. A representative methodology for comparing detected and reference gestures involves computing a correlation coefficient and comparing the result to a threshold indicative of a match. The reference gestures can be stored in cloud storage and updated by a multiplicity of hearing device wearers (one or more populations) over time. Updated reference gestures can be periodically downloaded from cloud storage to individual hearing devices to provide for improved gesture detection.

The hearing device processor may be configured to apply self-learning algorithms to adjust thresholds/signatures to improve (e.g., optimize) detection while reducing (e.g., minimizing) falsing. It is noted that falsing refers to a processor or decoder assuming that it is detecting a valid input when one is not present. Falsing is also known as a false decode. Additionally, the wearer can customize his or her motion/gesture to align with a specific setting or function for wearer control. Gesture or motion training can be implemented either pre-embedded in the hearing device or conducted by the wearer (or both). For example, fitting software for the hearing device or a mobile application executed by a smartphone or tablet can be used to assist in gesture training. An adaptive algorithm can be implemented to sense nominal conditions vs. gestures/motions. An app can be used to assist hearing device wearers in training gestures (e.g. voice assistance).

A falsing reading detection feature of the hearing device may be used by the wearer. For example, a mobile application or well characterized finger gesture can be used to indicate a falsing reading. A voice keyword detection function may also be used for a falsing reading detection. An audible feedback mechanism may assist the wearer to confirm the accuracy of a gesture input prior to altering a hearing device setting or implementing a hearing device function. For example, when a wearer is attempting to use his or her motion or gesture to control the hearing device, the wearer can perform a sample movement (e.g., finger flickering). The hearing device can generate a voice or tonal message requesting the wearer to confirm the setting (e.g., volume up) or command (e.g., connect hearing device with a streaming device). This wearer input verification feature serves to increase reliability and robustness against falsing.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1

An ear-worn electronic device configured to be worn by a wearer comprises a housing configured to be supported in, on or about the wearer's ear; a processor coupled to memory, the processor and memory disposed in the housing; a speaker or a receiver operably coupled to the processor; a radio frequency transceiver disposed in the housing and operably coupled to the processor; an antenna disposed in, on, or extending from the housing and operably coupled to the transceiver; and circuitry coupled to the antenna, transceiver, and processor. The circuitry is configured to measure a reflection coefficient of the antenna and the processor is configured to cooperate with the transceiver, antenna, and circuitry to transmit signals at a plurality of different frequencies to the antenna in accordance with a frequency hopping sequence; collect two-dimensional (2-D) reflection coefficient data comprising the reflection coefficient of the antenna as a function of frequency and of time in response to transmission of the signals; detect a particular input gesture of a plurality of input gestures of the wearer using the 2-D reflection coefficient data; and implement a predetermined function of the ear-worn electronic device in response to detecting the particular input gesture.

Example Ex2

The ear-worn electronic device according to Ex1, wherein the circuitry comprises a bridge circuit configured to measure input impedance of the antenna, and the processor is configured to obtain the reflection coefficient of the antenna from the bridge circuit.

Example Ex3

The ear-worn electronic device according to Ex1 or Ex2, wherein the circuitry comprises automatic antenna tuning and gesture detection circuitry.

Example Ex4

The ear-worn electronic device according to one or more of Ex1 to Ex3, wherein the circuitry comprises matching circuitry coupled to the antenna, and registers configured to record forward and reflected voltages to and from the antenna, wherein the processor is configured to measure the reflection coefficient of the antenna using the forward and reflected voltages.

Example Ex5

The ear-worn electronic device according to one or more of Ex1 to Ex4, wherein the processor is configured to implement input gesture detection using the circuitry during a fast time constant mode involving a fast time constant that is shorter in duration than a duration of the particular input gesture, and implement impedance matching between the transceiver and the antenna using the circuitry during a slow time constant mode involving a slow time constant that has a duration longer than a plurality of frequency hopping sequences.

Example Ex6

The ear-worn electronic device according to one or more of Ex1 to Ex5, wherein at least the particular input gesture comprises a single gesture or a multiplicity of gestures of the wearer, the single gesture comprises a hand gesture, a finger gesture, or a head gesture, and the multiplicity of gestures comprises any combination of the hand gesture, the finger gesture, and the head gesture.

Example Ex7

A method implemented by an ear-worn electronic device configured to be worn by a wearer and comprising a wireless transceiver operably coupled to an antenna, the method comprising transmitting, from the transceiver to the antenna, signals at a plurality of different frequencies in accordance with a frequency hopping sequence; collecting two-dimensional (2-D) reflection coefficient data comprising a reflection coefficient of the antenna as a function of frequency and of time in response to transmission of the signals; detecting a particular input gesture of a plurality of input gestures of the wearer using the 2-D reflection coefficient data; and implementing a predetermined function of the ear-worn electronic device in response to detecting the particular input gesture.

Example Ex8

The method according to Ex7, wherein the collected 2-D reflection coefficient data defines variations in the reflection coefficient of the antenna as a function of frequency and of time due to perturbation of a field of the antenna in response to the particular input gesture.

Example Ex9

The method according to Ex7 or Ex8, wherein detecting the particular input gesture comprises comparing the collected 2-D reflection coefficient data to reference 2-D reflection coefficient data indicative of the plurality of input gestures, and the reference 2-D reflection coefficient data is stored in one or both of a memory of the ear-worn electronic device and a memory of an external server communicatively coupled to the ear-worn electronic device.

Example Ex10

The method according to one or more of Ex7 to Ex9, comprising one or both of producing a time-frequency spectrogram using the collected 2-D reflection coefficient data, and detecting the particular input gesture by comparing the spectrogram to a plurality of reference spectrograms indicative of the plurality of input gestures; and performing a Fast Fourier Transform or a continuous wavelet transform on the collected 2-D reflection coefficient data, and detecting the particular input gesture from the plurality of input gestures using the transformed 2-D reflection coefficient data.

Example Ex11

The method according to one or more of Ex7 to Ex10, comprising generating a request perceivable by the wearer for a confirmation input prior to initiating the predetermined function, the request comprising an audio request generated by the ear-worn electronic device or an audio, textual, graphical or tactile request generated by an external device communicatively coupled to the ear-worn electronic device; and implementing the predetermined function in response to detecting a predetermined confirmation gesture or a predetermined verbal confirmation input provided by the wearer.

Example Ex12

The method according to one or more of Ex7 to Ex11, comprising detecting the particular input gesture using a sensor of the ear-worn electronic device, and implementing the predetermined function of the ear-worn electronic device in response to detecting the particular input gesture using the 2-D reflection coefficient data and data produced by the sensor.

Example Ex13

The method according to one or more of Ex7 to Ex12, comprising implementing input gesture training using the ear-worn electronic device and an external electronic device communicatively coupled to the ear-worn electronic device, wherein input gesture training is implemented by fitting software executed by the external electronic device.

Example Ex14

The method according to one or more of Ex7 to Ex13, comprising performing input gesture detection during a fast time constant mode involving a fast time constant that is shorter in duration than a duration of the particular input gesture, and performing impedance matching between the transceiver and the antenna during a slow time constant mode involving a slow time constant that has a duration longer than a plurality of frequency hopping sequences.

Example Ex15

The ear-worn electronic device according to one or more of Ex7 to Ex14, wherein at least the particular input gesture comprises a single gesture or a multiplicity of gestures of the wearer; the single gesture comprises a hand gesture, a finger gesture, or a head gesture; and the multiplicity of gestures comprises any combination of the hand gesture, the finger gesture, and the head gesture.

Figure 1B:
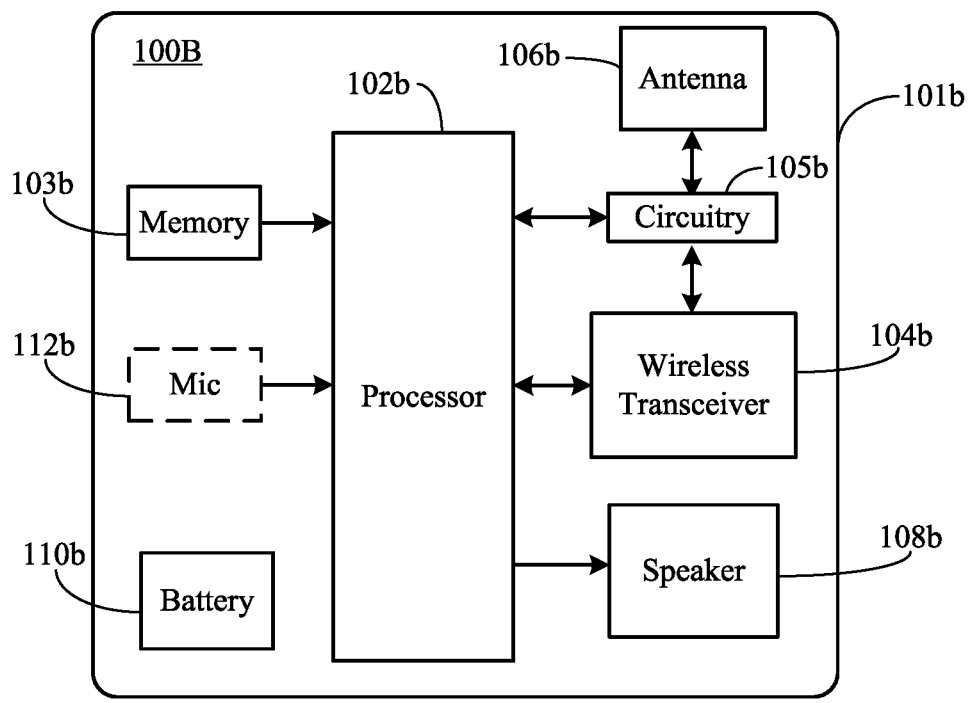

FIGS. 1A and 1B illustrate various components of a representative hearing device arrangement in accordance with various embodiments. FIGS. 1A and 1B illustrate first and second hearing devices 100A and 100B configured to be supported at, by, in or on left and right ears of a wearer. In some embodiments, a single hearing device 100A or 100B can be supported at, by, in or on the left or right ear of a wearer. As illustrated, the first and second hearing devices 100A and 100B include the same functional components. It is understood that the first and second hearing devices 100A and 100B can include different functional components. The first and second hearing devices 100A and 100B can be representative of any of the hearing devices disclosed herein.

The first and second hearing devices 100A and 100B include an enclosure 101a, 101b configured for placement, for example, over or on the ear, entirely or partially within the external ear canal (e.g., between the pinna and ear drum) or behind the ear. Disposed within the enclosure 101a, 101b is a processor 102a, 102b which incorporates or is coupled to memory 103a, 103b. The processor 102a, 102b can include or be implemented as a multi-core processor, a digital signal processor (DSP), an audio processor or a combination of these processors. For example, the processor 102a, 102b may be implemented in a variety of different ways, such as with a mixture of discrete analog and digital components that include a processor configured to execute programmed instructions contained in a processor-readable storage medium (e.g., solid-state memory, e.g., Flash).

The processor 102a, 102b is coupled to a wireless transceiver 104a, 104b (also referred to herein as a radio), such as a BLE transceiver or other IEEE 802.11 compliant transceiver. The wireless transceiver 104a, 104b is operably coupled to an antenna 106a, 106b configured for transmitting and receiving radio signals. The antenna 106a, 106b is disposed in, on, or extends from the enclosure 101a, 101b. The wireless transceiver 104a, 104b and the antenna 106a, 106b can be configured to operate in the 2.4 GHz ISM frequency band or other applicable communication band (referred to as the "Bluetooth® band" herein). The wireless transceiver 104a, 104b and antenna 106a, 106b can be configured to enable ear-to-ear communication between the two hearing devices 100A and 100B, as well as communications with an external device (e.g., a smartphone or a digital music player).

The wireless transceiver 104a, 104b is configured to implement a frequency hopping methodology, such as frequency-hopping spread spectrum (FHSS), for transmission of radio signals. FHSS transmission involves the repeated switching of frequencies during radio transmission to reduce interference and avoid interception. FHSS is useful to counter eavesdropping, to obstruct jamming of telecommunications, and to minimize the effects of unintentional interference. According to an FHSS transmission methodology, the transmitter of the wireless transceiver 104a, 104b hops between available narrowband frequencies within a specified broad channel in a pseudo-random sequence or other sequence known to both sender and receiver. For example, the transmitter can hop to a new frequency more than twice per second. A short burst of data is transmitted on the current narrowband channel for a predetermined period of time (e.g., hop or dwell time), then the transmitter and receiver tune to the next frequency in the sequence for the next burst of data. Because no channel is used for long period of time, and the odds of any other transmitter being on the same channel at the same time are low, FHSS is often used as a method to allow multiple transmitter and receiver pairs to operate in the same frequency space on the same broad channel at the same time.

The first and second hearing devices 100A and 100B include circuitry 105a, 105b coupled to the antenna 106a, 106b, wireless transceiver 104a, 104b, and processor 102a, 102b. The circuitry 105a, 105b is configured to measure a reflection coefficient (e.g., S11) of the antenna 106a, 106b in response to signals transmitted by the wireless transceiver 104a, 104b at a plurality of different frequencies in accordance with a frequency hopping sequence. The processor 102a, 102b is configured to cooperate with the wireless transceiver 104a, 104b, antenna 106a, 106b, and circuitry 105a, 105b to collect 2-D reflection coefficient data comprising the reflection coefficient of the antenna 106a, 106b as a function of frequency and as a function of time (e.g., S11 vs. frequency and S11 vs. time) in response to transmission of the signals. The processor 102a, 102b can store the 2-D reflection coefficient data in a memory 103a, 103b as a matrix of S11 values as a function of time and of frequency. The processor 102a, 102b can be configured to perform time-frequency analysis on the 2-D reflection coefficient data to detect a gesture by the wearer. After detecting the gesture, which may involve verification of the gesture by the wearer via a user input (e.g., a verification gesture), the processor 102a, 102b implements an instruction to perform a predetermined function corresponding to the detected gesture. The processor 102a, 102b can implement a correlation algorithm to determine a match between a detected gesture and a reference gesture stored in the memory 103a, 103b and/or in cloud storage. Reference gestures can be stored in a database, a table, a library, a dictionary or any other type of memory structure in the memory 103a, 103b and/or in cloud storage (e.g., remote server storage).

A battery 110a, 100b or other power source (rechargeable or conventional) is provided within the enclosure 101a, 101b and is configured to provide power to the various components of the hearing devices 100A and 100B. A speaker or receiver 108a, 108b is coupled to an amplifier (not shown) and the processor 102a, 102b. The speaker or receiver 108a, 108b is configured to generate sound which is communicated to the wearer's ear.

In some embodiments, the hearing devices 100A and 100B include a microphone 112a, 112b mounted on or inside the enclosure 101a, 101b. The microphone 112a, 112b may be a single microphone or multiple microphones, such as a microphone array. The microphone 112a, 112b can be coupled to a preamplifier (not shown), the output of which is coupled to the processor 102a, 102b. The microphone 112a, 112b receives sound waves from the environment and converts the sound into an input signal. The input signal is amplified by the preamplifier and sampled and digitized by an analog-to-digital converter of the processor 102a, 102b, resulting in a digitized input signal. In some embodiments (e.g., hearing aids), the processor 102a, 102b (e.g., DSP circuitry) is configured to process the digitized input signal into an output signal in a manner that compensates for the wearer's hearing loss. When receiving an audio signal from an external source, the wireless transceiver 104a, 104b may produce a second input signal for the DSP circuitry of the processor 102a, 102b that may be combined with the input signal produced by the microphone 112a, 112b or used in place thereof. In other embodiments, (e.g., hearables), the processor 102a, 102b can be configured to process the digitized input signal into an output signal in a manner that is tailored or optimized for the wearer (e.g., based on wearer preferences). The output signal is then passed to an audio output stage that drives the speaker or receiver 108a, 108b, which converts the output signal into an audio output.

Figure 2:
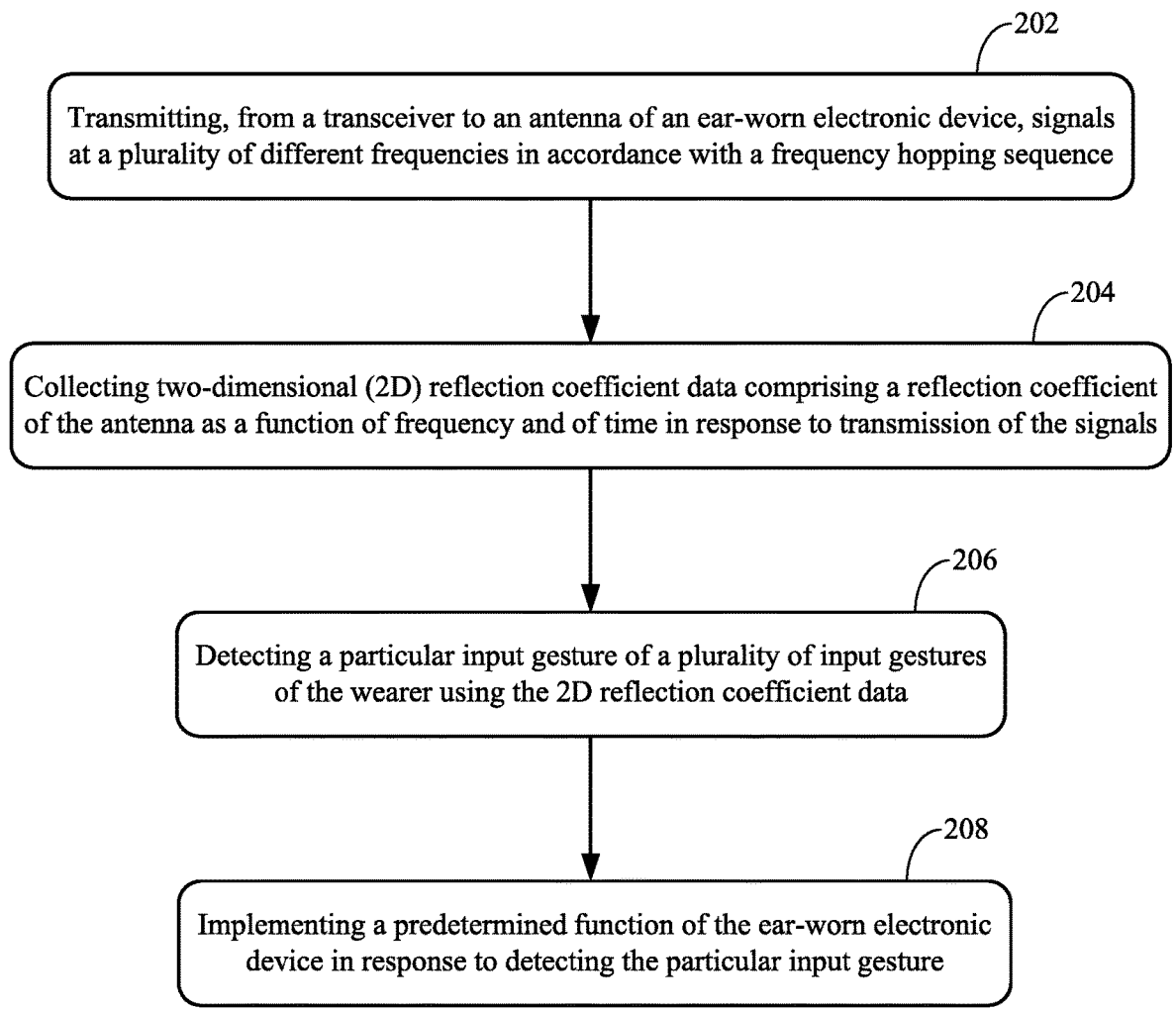
FIG. 2 illustrates a gesture control method using frequency-hopping spread spectrum (FHSS) transmission implemented by an ear-worn electronic device in accordance with any of the embodiments disclosed herein.

FIG. 2 illustrates a gesture control method using FHSS transmission implemented by an ear-worn electronic device in accordance with any of the embodiments disclosed herein. The method shown in FIG. 2 involves transmitting 202, from a transceiver to an antenna of an ear-worn electronic device, signals at a plurality of different frequencies in accordance with a frequency hopping sequence. The method involves collecting 204 2-D reflection coefficient data comprising a reflection coefficient of the antenna as a function of frequency and of time in response to transmission of the signals. For example, collecting the 2-D reflection coefficient data can involve measuring the reflection coefficient of the antenna for each frequency of the frequency hopping sequence and at times at which each frequency of the frequency hopping sequence repeats. The method also involves detecting 206 a particular input gesture of a plurality of input gestures of the wearer using the 2-D reflection coefficient data. The method also involves implementing 208 a predetermined function of the ear-worn electronic device in response to detecting the particular gesture.

Figure 3:
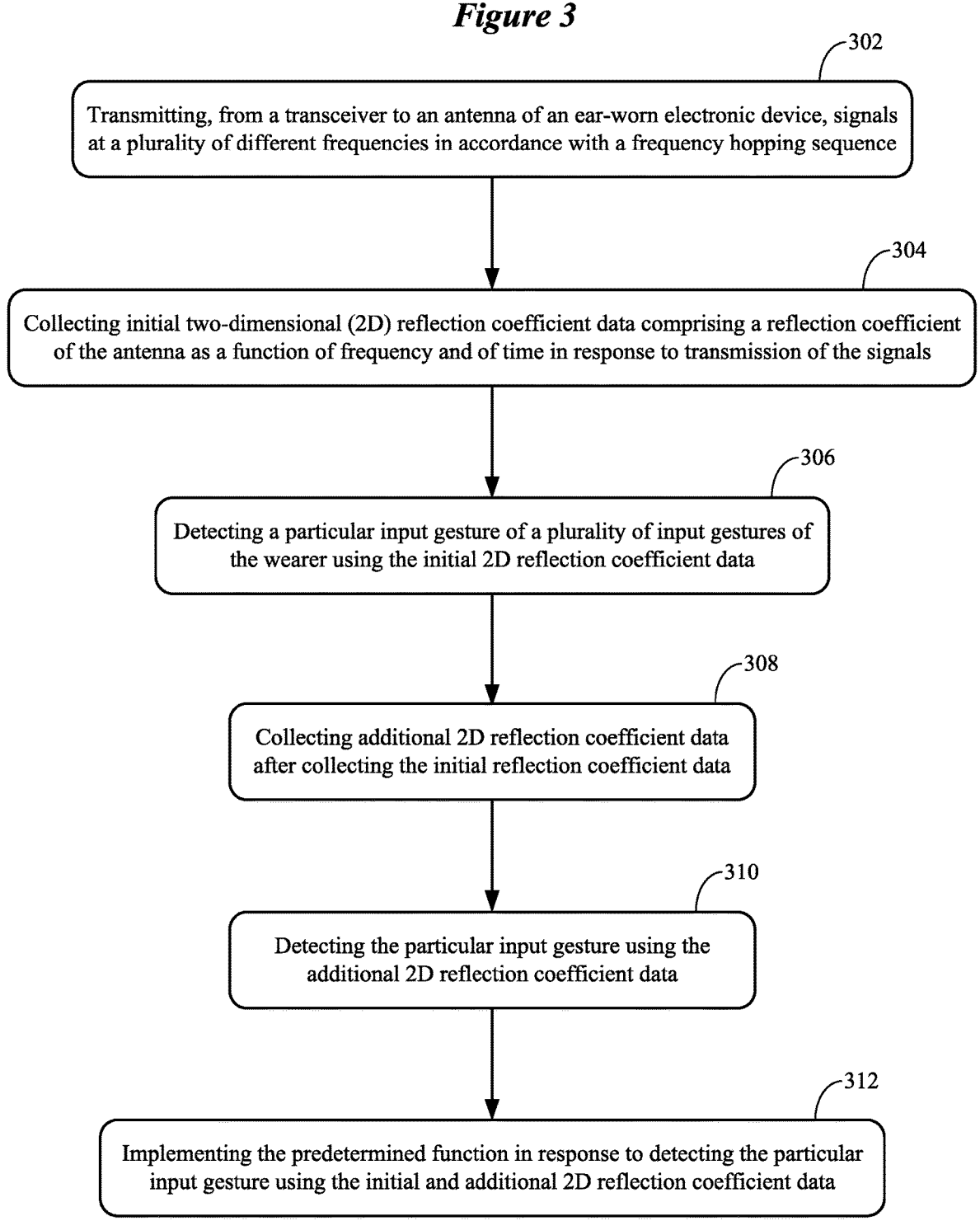
FIG. 3 illustrates a gesture control method using FHSS transmission implemented by an ear-worn electronic device in accordance with any of the embodiments disclosed herein.

FIG. 3 illustrates a gesture control method using FHSS transmission implemented by an ear-worn electronic device in accordance with any of the embodiments disclosed herein. The method shown in FIG. 3 involves transmitting 302, from a transceiver to an antenna of an ear-worn electronic device, signals at a plurality of different frequencies in accordance with a frequency hopping sequence. The method involves collecting 304 2-D reflection coefficient data comprising a reflection coefficient of the antenna as a function of frequency and of time in response to transmission of the signals. The method also involves detecting 306 a particular input gesture of a plurality of input gestures of the wearer using the 2-D reflection coefficient data. The method illustrated in FIG. 3 additionally involves collecting 308 additional 2-D reflection coefficient data after collecting the initial reflection coefficient data. The method also involves detecting 310 the particular input gesture using the additional 2-D reflection coefficient data. The method further involves implementing 312 the predetermined function in response to detecting the particular input gesture using the initial and additional 2-D reflection coefficient data.

Figure 4A:
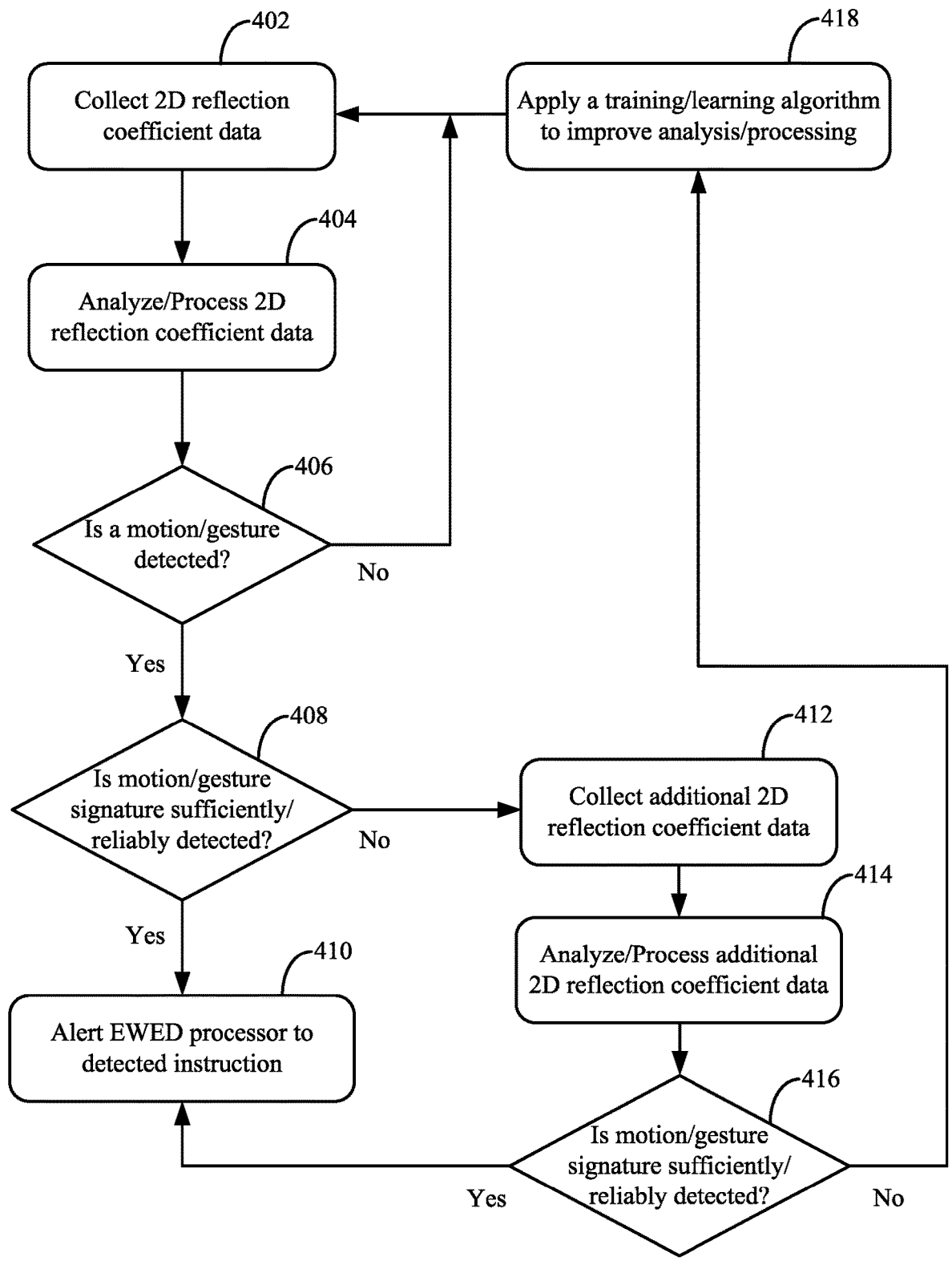
FIG. 4A illustrates a gesture control method using FHSS transmission implemented by an ear-worn electronic device in accordance with any of the embodiments disclosed herein.

FIG. 4A illustrates a gesture control method using FHSS transmission implemented by an ear-worn electronic device in accordance with any of the embodiments disclosed herein. The method shown in FIG. 4A involves collecting 402 2-D reflection coefficient data comprising a reflection coefficient of the antenna as a function of frequency and of time as previously discussed. The method involves analyzing/processing 404 the 2-D reflection coefficient data to determine if a motion/gesture has been detected 406. If a motion/gesture is not detected, processing returns to block 402 and the collection of 2-D reflection coefficient data continues. If a motion/gesture is detected 406, a check is made 408 to determine if the motion/gesture signature has been sufficiently/reliably detected. For example, a check can be made to determine if the motion/gesture signature corresponds to an instruction for implementing a predetermined function of the ear-worn electronic device. If so, the processor of the ear-worn electronic device (EWED) is alerted 410 to the detected instruction.

If, at block 408, it is determined that the motion/gesture signature has not been sufficiently/reliably detected, the method involves collecting 412 additional 2-D reflection coefficient data and analyzing/processing 414 the additional 2-D reflection coefficient data as an alternate or enhanced effort to detect a motion/gesture. This alternate or enhanced motion/gesture detection processing provides for more robust/reliable motion/gesture detection with less false detections of unintended motion/gestures. A check is made 416 to determine if the motion/gesture signature has been sufficiently/reliably detected. If so, the processor of the ear-worn electronic device is alerted 410 to the detected instruction. If not, the method involves supplying 418 a training/learning algorithm to improve analysis/processing of the 2-D reflection coefficient data.

Figure 4B:
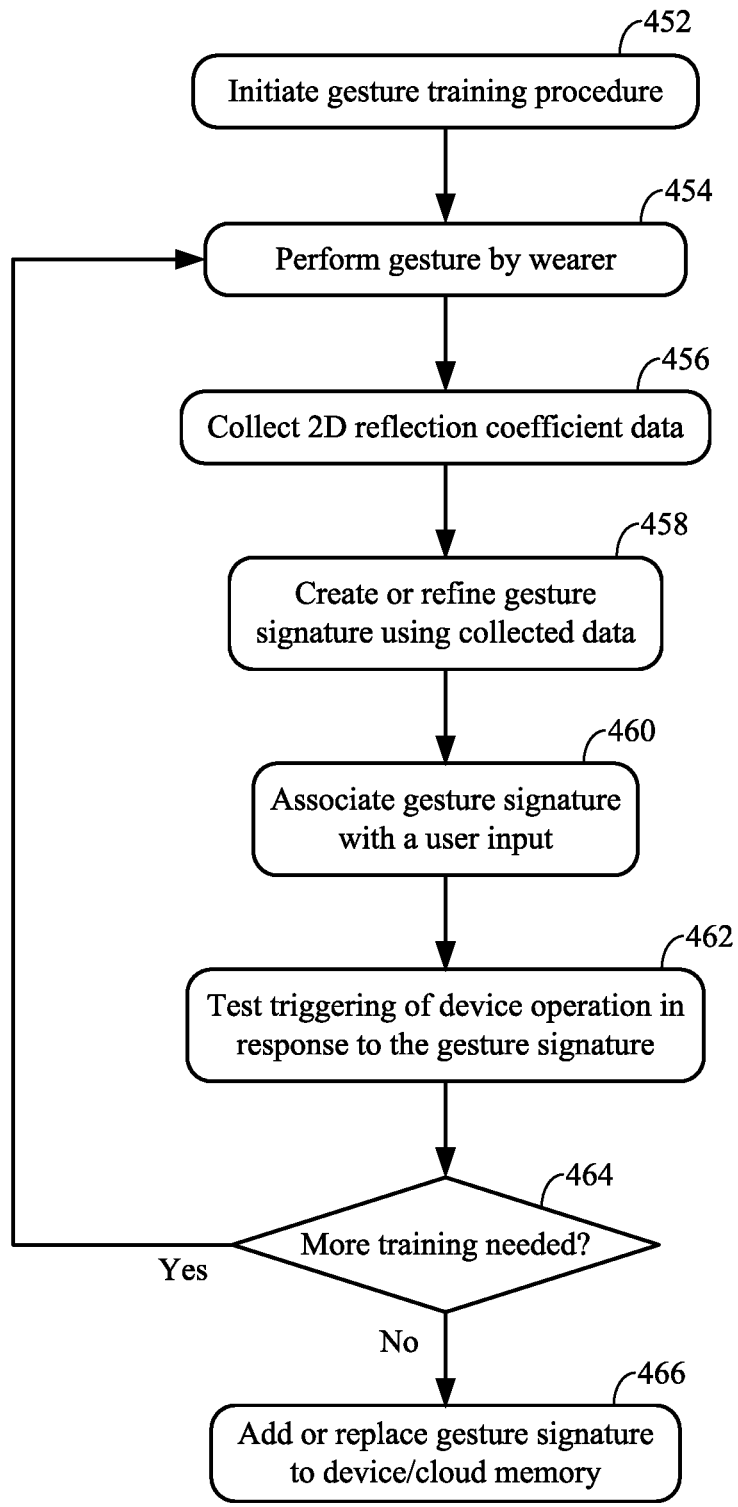
FIG. 4B illustrates a gesture training method implemented by an ear-worn electronic device in accordance with any of the embodiments disclosed herein.

FIG. 4B illustrates a gesture training method implemented by an ear-worn electronic device in accordance with any of the embodiments disclosed herein. The ear-worn electronic device can incorporate a training system configured to determine the reflection coefficient signal pattern or signature of the antenna for each gesture that corresponds to a hearing device user input. For example, the ear-worn electronic device can incorporate a machine learning system configured to implement a training/learning algorithm. The machine learning system can be configured to implement a machine training/learning process using a deep neural network. As was previously discussed, gesture or motion training can be implemented either pre-embedded in the hearing device or conducted by the wearer (or both). Fitting software for the hearing device or a mobile application executed by a smartphone or tablet can be used to assist in gesture training. An app can be used to assist hearing device wearers in training gestures.

The method shown in FIG. 4B involves initiating 452 a gesture training procedure. The gesture training procedure can be initiated at any time, such as at the time of device manufacture, during fitting of the device, and/or at any time during use of the device by the wearer, a caregiver, a clinician or a technician. The training procedure involves performing 454 a gesture by the wearer, and collecting 456 2D reflection coefficient data during performance of the gesture. The method involves creating 458 a new (or refining an existing) gesture signature or pattern using the collected data, and associating 460 the gesture signature with a user input. The method also involves testing 462 triggering of a device operation in response to the gesture signature. If more training is needed 464 to further refine the gesture signature, the processes of blocks 454 through 462 can be repeated. If no more training is needed, the method involves adding or replacing 466 the gesture signature to one or both of the hearing device memory and cloud memory.

It is understood that a particular user input to the hearing device can be associated with a multi-gesture signature, in which two or more gestures define the particular user input. The gesture training method illustrated in FIG. 4B can be implemented to facilitate training of single and multiple wearer gestures.

In the context of any of the embodiments disclosed herein, a gesture can be defined by a single simple or complex wearer gesture or by a multiplicity of simple and/or complex wearer gestures. User inputs to a hearing device comprising a multiplicity of wearer gestures increases the number of hearing device functions that can be controlled with the gestures. For example, consider Table 1 below:

| Sequence | Gesture 1 | Gesture 2 | Gesture 3 | Function |
|---|---|---|---|---|
| 1 | A | A | A | 1 |
| 2 | A | A | B | 2 |
| 3 | A | B | A | 3 |
| 4 | A | B | B | 4 |
| 5 | B | A | A | 5 |
| 6 | B | A | B | 6 |
| 7 | B | B | A | 7 |
| 8 | B | B | B | 8 |

According to the representative example shown in Table 1 above, for N gestures in a sequence of M length, a total of NAM hearing device functions can be made available.

FIG. 5 illustrates a gesture control method using FHSS transmission implemented by an ear-worn electronic device in accordance with any of the embodiments disclosed herein. The method shown in FIG. 5 involves transmitting 502, from a transceiver to an antenna of an ear-worn electronic device, signals at a plurality of different frequencies in accordance with a frequency hopping sequence. The method involves collecting 504 2-D reflection coefficient data comprising a reflection coefficient of the antenna as a function of frequency and of time in response to transmission of the signals. The method also involves detecting 506 a particular input gesture of a plurality of input gestures of the wearer using the 2-D reflection coefficient data, wherein the particular input gesture corresponds to a predetermined function of the ear-worn electronic device. The method further involves generating 508 a request perceivable by the wearer (e.g., a particular tone, voice message, tactile output) for a confirmation input prior to initiating the predetermined function. For example, the request can comprise an audio request generated by the ear-worn electronic device. Additionally or alternatively, the request can comprise an audio, textual, graphical or tactile request generated by an external device communicatively coupled to the ear-worn electronic device (e.g., a smartphone, tablet or a mobile app on a smart device or other electronic device). The method also involves implementing 510 the predetermined function in response to detecting the confirmation input (e.g., a confirmation gesture, verbal confirmation input) provided by the wearer. It is noted that the confirmation input provided by the wearer may be used to further train the gesture discernment process, in addition to preventing actions on false gesture detection.

As was previously discussed, an ear-worn electronic device can be configured with a gesture control system that provides for detection of more than one gesture that drives one response of the device. For example, a sequence of detected gestures can drive one or more responses. Furthermore, a multi-layer gesture driven menu of a "gesture user interface" (e.g., a GeUI) can be implemented to interactively interface via auditory feedback to the wearer of the ear-worn electronic device. A gesture user interface can provide for greater flexibility and ease of use (e.g., instead of touching a virtual button on a touch screen to descend to another control screen/menu). For example, a gesture can substitute for the virtual button, and the auditory feedback can prompt which subsequent gestures would elicit which responses (e.g., become an auditory equivalent to a touch-screen).

Figure 6:
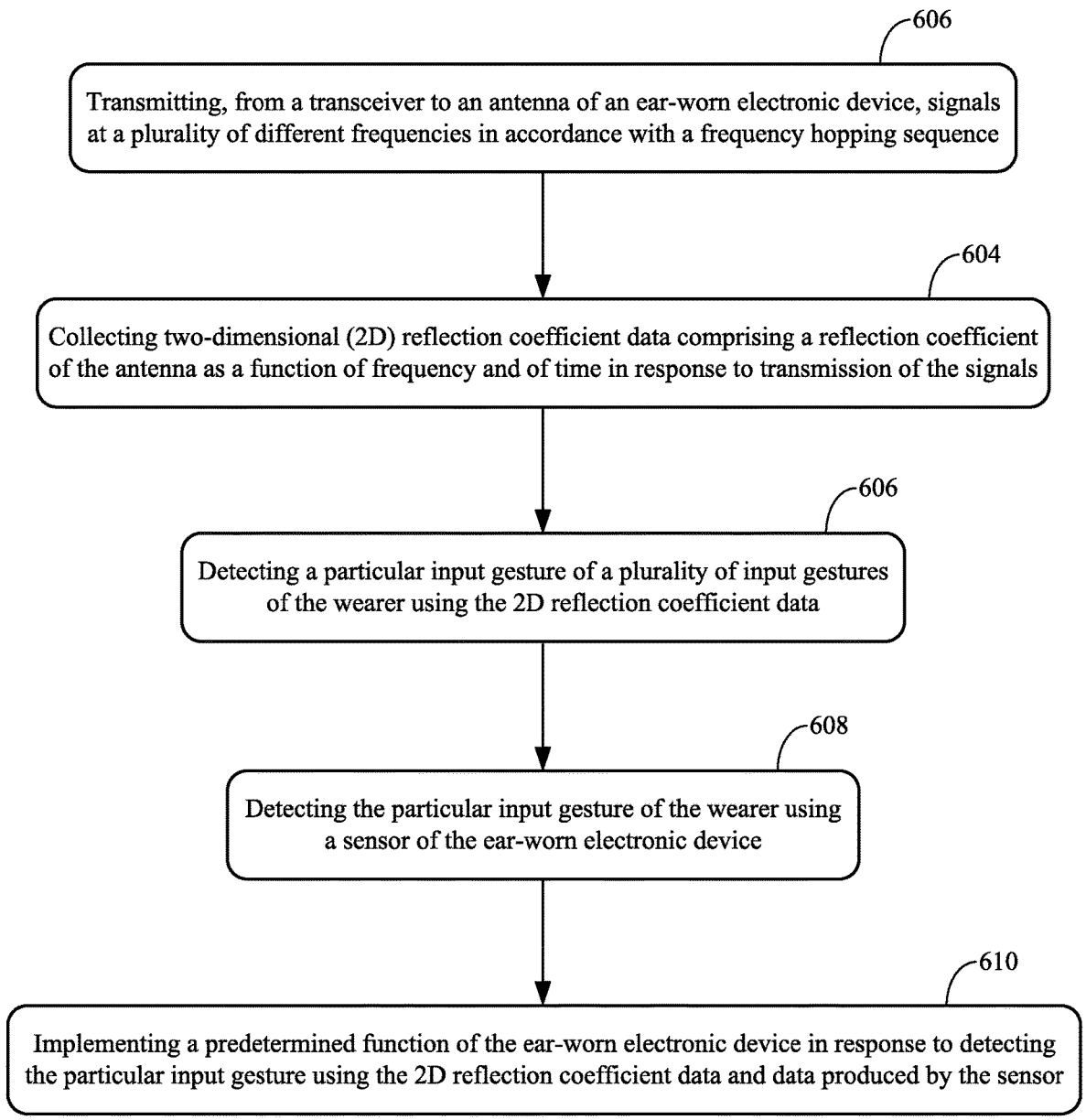
FIG. 6 illustrates a gesture control method using FHSS transmission implemented by an ear-worn electronic device in accordance with any of the embodiments disclosed herein.

FIG. 6 illustrates a gesture control method using FHSS transmission implemented by an ear-worn electronic device in accordance with any of the embodiments disclosed herein. The method shown in FIG. 6 involves transmitting 602, from a transceiver to an antenna of an ear-worn electronic device, signals at a plurality of different frequencies in accordance with a frequency hopping sequence. The method involves collecting 604 2-D reflection coefficient data comprising a reflection coefficient of the antenna as a function of frequency and of time in response to transmission of the signals. The method also involves detecting 606 a particular input gesture of a plurality of input gestures of the wearer using the 2-D reflection coefficient data. The method shown in FIG. 6 additionally involves detecting 608 the particular input gesture of the wearer using a sensor of the ear-worn electronic device. The sensor can comprise one or more of an accelerometer, a gyroscope, and an inertial measurement unit (IMU), for example. The method further involves implementing 610 a predetermined function of the ear-worn electronic device in response to detecting the particular gesture using the 2-D reflection coefficient data and data produced by the sensor.

Figure 7:
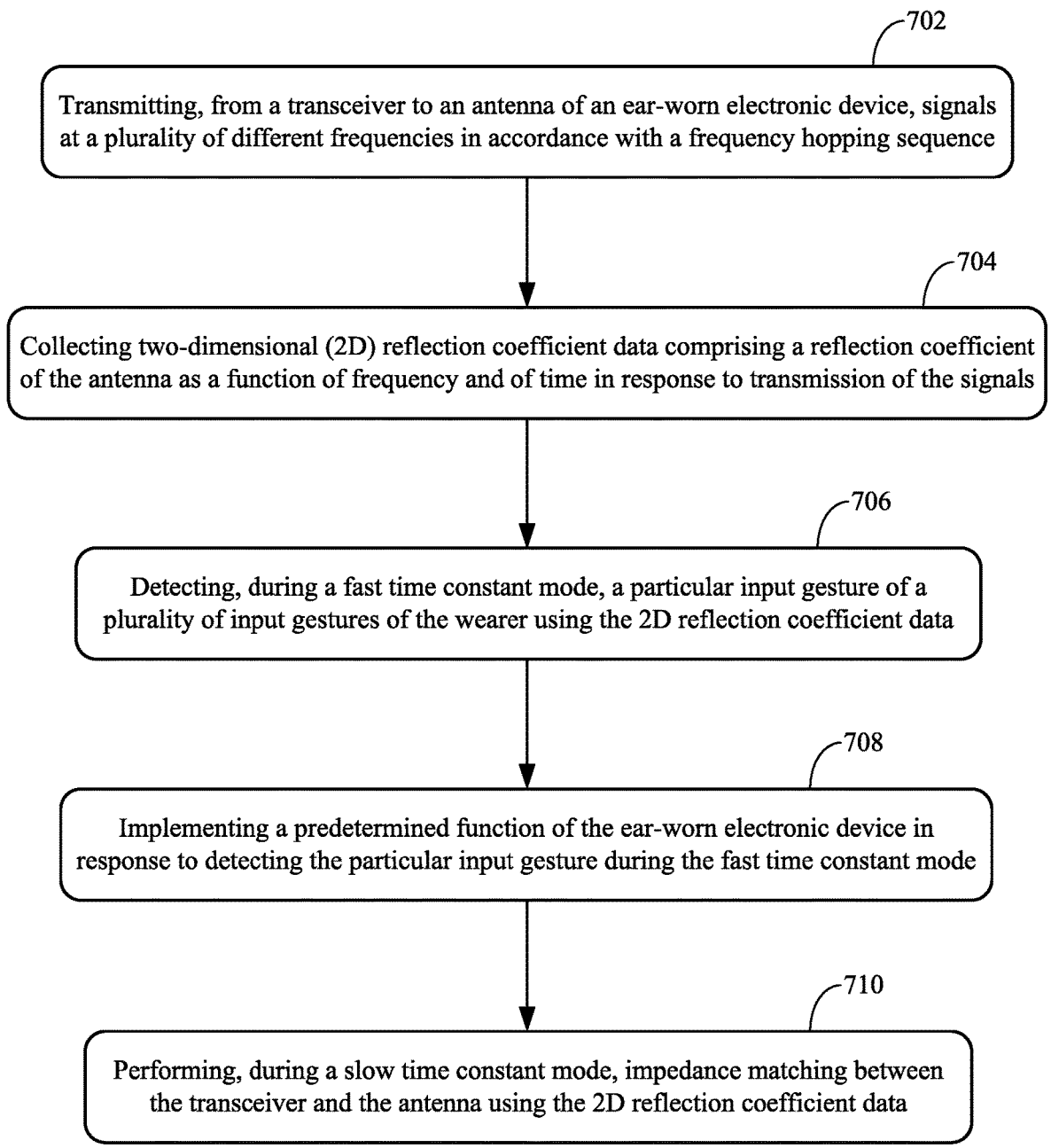
FIG. 7 illustrates a gesture control method using FHSS transmission implemented by an ear-worn electronic device in accordance with any of the embodiments disclosed herein.

FIG. 7 illustrates a gesture control method using FHSS transmission implemented by an ear-worn electronic device in accordance with any of the embodiments disclosed herein. The method shown in FIG. 7 involves transmitting 702, from a transceiver to an antenna of an ear-worn electronic device, signals at a plurality of different frequencies in accordance with a frequency hopping sequence. The method involves collecting 704 2-D reflection coefficient data comprising a reflection coefficient of the antenna as a function of frequency and of time in response to transmission of the signals. The method also involves detecting 706, during a fast time constant mode, a particular input gesture of a plurality of input gestures of the wearer using the 2-D reflection coefficient data. The method further involves implementing 708 a predetermined function of the ear-worn electronic device in response to detecting the particular gesture during the fast time constant mode. The method also involves performing 710, during a slow time constant mode, impedance matching between the transceiver and the antenna using the 2-D reflection coefficient data.

Figure 8:
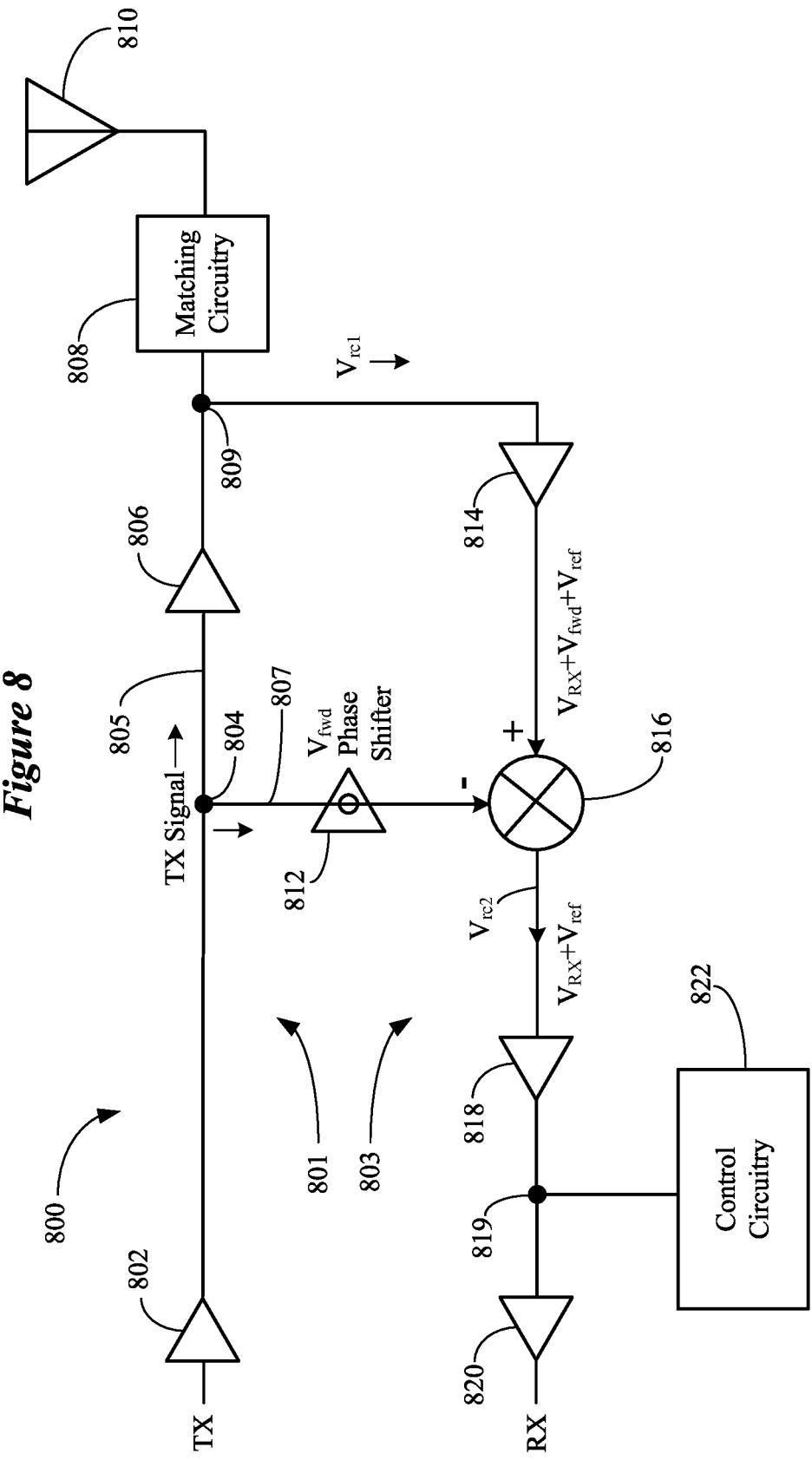
FIG. 8 illustrates a gesture control system of an ear-worn electronic device that uses FHSS transmission implemented in accordance with any of the embodiments disclosed herein.

FIG. 8 illustrates a gesture control system of an ear-worn electronic device that uses FHSS transmission implemented in accordance with any of the embodiments disclosed herein. The gesture control system 800 shown in FIG. 8 includes a transmit channel 801 and a receive channel 803 respectively coupled to an antenna 810 via matching circuitry 808. The transmit channel 801 is configured to receive a transmit signal (TX signal) from a wireless transceiver (TX) configured to implement a frequency hopping methodology, such as FHSS, for transmission of radio signals via the antenna 810. As the frequency hops, the antenna input impedance changes. The adaptive matching circuitry 808 is configured to improve the antenna impedance match. At node 804, the transmit signal (TX signal) is communicated to the matching circuitry 808 and antenna 810 along a first path 805, and to a forward voltage phase shifter 812 along a second path 807. Registers 802 and 806 are configured to record the forward voltages to the antenna 810 at locations of the transmit channel 801 prior to and after node 804 as shown.

The receive channel 803 receives a voltage signal $V_{rc1}$ from node 809. The voltage signal $V_{rc1}$ includes voltage components $V_{RX}$, $V_{fwd}$, and $V_{ref}$, where $V_{RX}$ is the receive signal voltage, $V_{fwd}$ is the forward voltage at node 809, and $V_{ref}$ is the reflected voltage from the antenna 810. The voltage signal $V_{rc1}$ is communicated to a summing junction 816. The summing junction 816 also receives the forward voltage $V_{fwd}$ from the phase shifter 812. The phase shifter 812 is adjusted by control circuitry 822 to optimize cancellation of the forward voltage $V_{fwd}$ from the voltage signal $V_{rc1}$. The summing junction 816 is configured to subtract the forward voltage $V_{fwd}$ from the voltage signal $V_{rc1}$ and output a voltage signal $V_{rc2}$. The voltage signal $V_{rc2}$ includes voltage components $V_{RX}$ and $V_{ref}$. At node 819, the reflected voltage $V_{ref}$ is communicated to control circuitry 822, and the received signal $V_{RX}$ is communicated to a receiver (RX) of the wireless transceiver. Registers 814, 818, and 820 are configured to record the reflected voltages from the antenna 810 at locations of the receive channel 803 prior to and after detector 816 as shown. Advantageously, the gesture control system 800 provides for concurrent gesture detection and normal RF communications to/from the hearing device.

The control circuitry 822 is configured to perform a variety of functions for controlling the gesture control system 800. The control circuitry 822 can incorporate or be coupled to one or more processors of the hearing device (e.g., processor 102 shown in FIGS. 1A-1B). The control circuitry 822 is configured to provide control signals to adjust the phase shifter 812 to optimize cancellation of the forward voltage $V_{fwd}$ from the voltage signal $V_{rc1}$. The control circuitry 822 also receives the reflected voltage signal $V_{ref}$ and is configured to calculate 2-D reflection coefficient data using the reflected voltage signal $V_{ref}$ and the forward voltage $V_{fwd}$.

For example, the control circuitry 822 can be configured to compute the values of S11 as $V_{ref}/V_{fwd}$ as a function of time and of frequency as the frequency hops through its hopping sequence. The control circuitry 822 can store the 2-D reflection coefficient data in a memory as a matrix of S11 values as a function of time and of frequency computed by the control circuitry 822. The control circuitry 822 can also be configured to compare the forward and reflected voltages $V_{ref}$ and $V_{fwd}$ for each frequency in the hopping sequence. The control circuitry 822 can implement an algorithm that monitors the forward and reflected power of the antenna 810 and matching circuitry 808. The algorithm can be configured to adjust the match according to this real-time Voltage Standing Wave Ratio (VSWR).

The control circuitry 822 can control operation of the circuitry shown in FIG. 8 using two different time constants, namely, a slow time constant and a fast time constant. When operating in a slow time constant mode, the control circuitry 822 uses a slow time constant to optimize the antenna match implemented by the matching circuitry 808 for power transferring to the antenna 810. The slow time constant mode can involve a slow time constant that has a duration longer than a multiplicity of frequency hopping sequences. When operating in a fast time constant mode, the control circuitry 822 uses a fast time constant for gesture detection. The fast time constant mode can involve a fast time constant that is shorter in duration than a duration of the particular input gesture. During the fast time constant mode, the antenna match is not adjusted by the matching circuitry 808 in order to facilitate detection of electrical field perturbations due to finger, hand, and head gestures made by the wearer.

According to any of the embodiments disclosed herein, a hearing device which incorporates gesture detection and device control can be configured to operate in the Bluetooth® band (e.g., 2.4 GHz Bluetooth range). For hearing devices configured to operate in the Bluetooth® band, the default protocol utilizes adaptive frequency hopping (AFH) to mitigate potential in-band interference. The changing frequency adds complexity including large signal variation and longer processing time to implement the 2-D S11-parameter based gesture recognition. In this scenario, only channels in the current channel map are used for slow time constant matching and fast time constant gesture detection. Channel(s) condemned from the AFH channel map may be used for slow time constant matching and fast time constant gesture detection, if these channels are more reliable.

Alternatively, an algorithm implemented by the hearing device's gesture control system can take advantage of the frequency hopping algorithm, as a fixed channel might not have the desired characteristic for a certain gesture. The receiver scheme can be implemented by a single fixed channel, a single adaptive channel, multiple channels, multiple adaptive channels, or all channels. This can be part of the advertising channel, normal operation of the radio protocol, or an extension to the standard radio protocol (e.g. Continuous Wave, chirp, Doppler etc.). If a hearing device is not in the active connection, the advertising channels can be used for matching and gesture detection. If reliable gesture and matching is not viable with a limited channel map being used by the hearing device, additional channels may be added for gesture detection.

Figure 9:
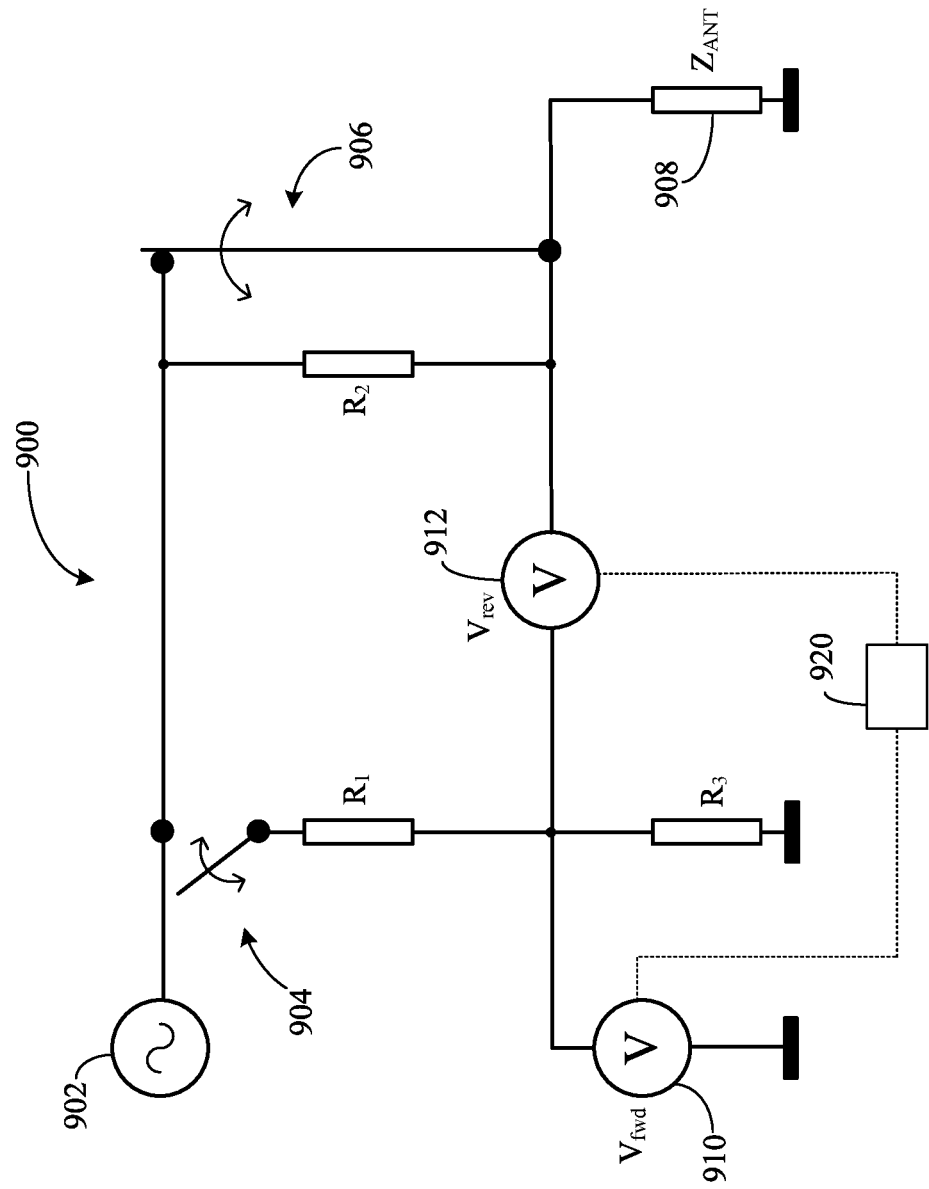
FIG. 9 illustrates a gesture control system of an ear-worn electronic device that uses FHSS transmission implemented in accordance with any of the embodiments disclosed herein.

FIG. 9 illustrates a gesture control system of an ear-worn electronic device that uses FHSS transmission implemented in accordance with any of the embodiments disclosed herein. The gesture control system 900 shown in FIG. 9 is configured to extract 2-D reflection coefficient data (2-D S11) by monitoring the antenna impedance. The antenna's input impedance can be measured using the circuitry shown in FIG. 9, which can be an integrated circuit in the form of a Wheatstone Bridge, for example.

The gesture control system 900 illustrated in FIG. 9 includes an RF transceiver 902 (e.g., an RF chip transceiver), three resistors $R_1$, $R_2$, $R_3$ (e.g., each being 50-Ohm resistors), two voltmeters 910, 912, and an antenna 908. The gesture control system 900 also includes a first switch 904 and a second switch 906. The first switch 904 is a normally-open single pole single throw (SPST) switch, and the second switch 906 is a normally-closed single pole single throw (SPST) switch. In a normal operating mode, the transceiver 902 directly connects to the antenna 908 for EM transmission purposes. In the normal operating mode, the first switch 904 is open and the second switch 906 is closed, such that the antenna impedance measuring circuitry of the gesture control system 900 is disconnected/disabled.

In a non-normal (measuring) mode, the transceiver 902 connects to the resistors $R_1$, $R_2$, $R_3$, forming a bridge circuit. The voltmeter 910 is used to measure the voltage, $V_{fwd}$, across one of the 50-Ohm resistors (e.g., $R_3$). The voltmeter 910 is applied to measure the electrical potential difference between the resistor $R_3$ and the antenna 908. A minimum voltage, $V_{rev}$, measured by the voltmeter 912 indicates that the antenna's impedance is closest to the 50 Ohms, for the best match. Using the voltage values measured by the voltmeters 910, 912, the antenna's impedance and mismatch can be calculated, such as by a logic device or processor 920.

The logic device or processor 920 (e.g., processor 102 in FIGS. 1A-1B or other processor) can be configured to compute the values of S11 as $V_{rev}/V_{fwd}$ (as measured by voltmeters 910, 912) as a function of time and of frequency as the frequency hops through its hopping sequence. The logic device or processor 920 can store the 2-D reflection coefficient data in a memory as a matrix of S11 values computed as a function of time and of frequency.

It is noted that, in order to measure the actual antenna impedance value including the reactive element, a modification of the circuitry shown in FIG. 9 can be made. For example, a Maxwell or Wien Bridge circuit can be utilized to measure the unknown resistance, inductance or capacitance ($Z_{ANT}$) of antenna 908. It is further noted that the gesture control system illustrated in FIG. 9 provides for alternating gesture detection and normal RF communications to/from the hearing device.

Figure 10:
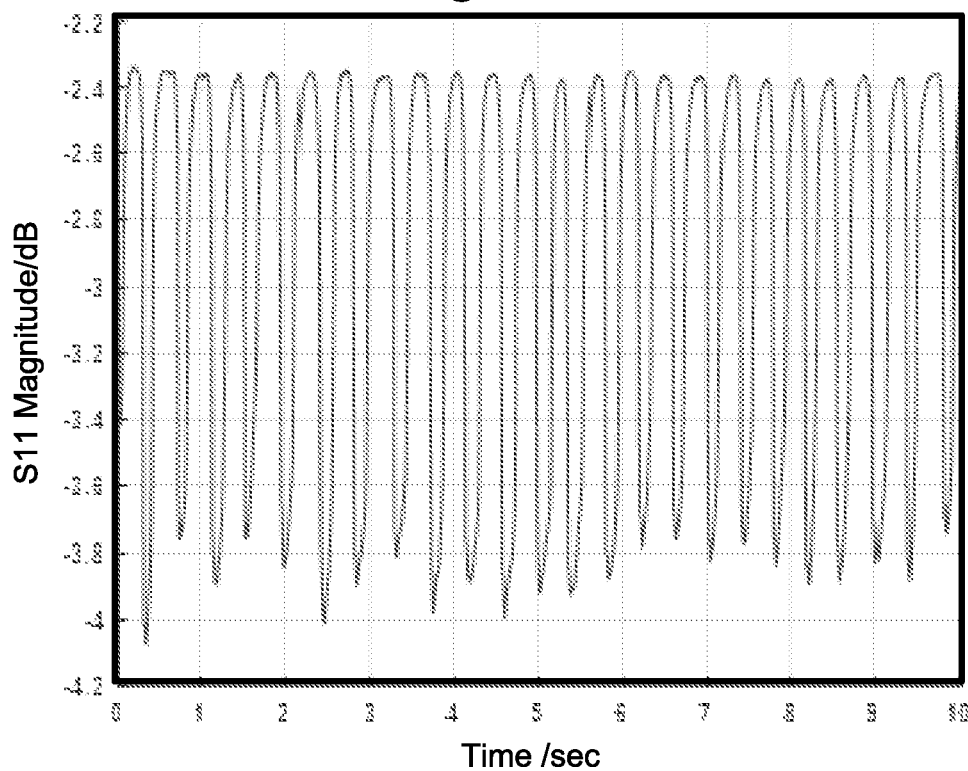
FIG. 10 shows the magnitude of a reflection coefficient (S11) signal having a particular pattern as a function of time resulting from a gesture made by a wearer's finger proximate an antenna of a hearing device in accordance with any of the embodiments disclosed herein.
Figure 11:
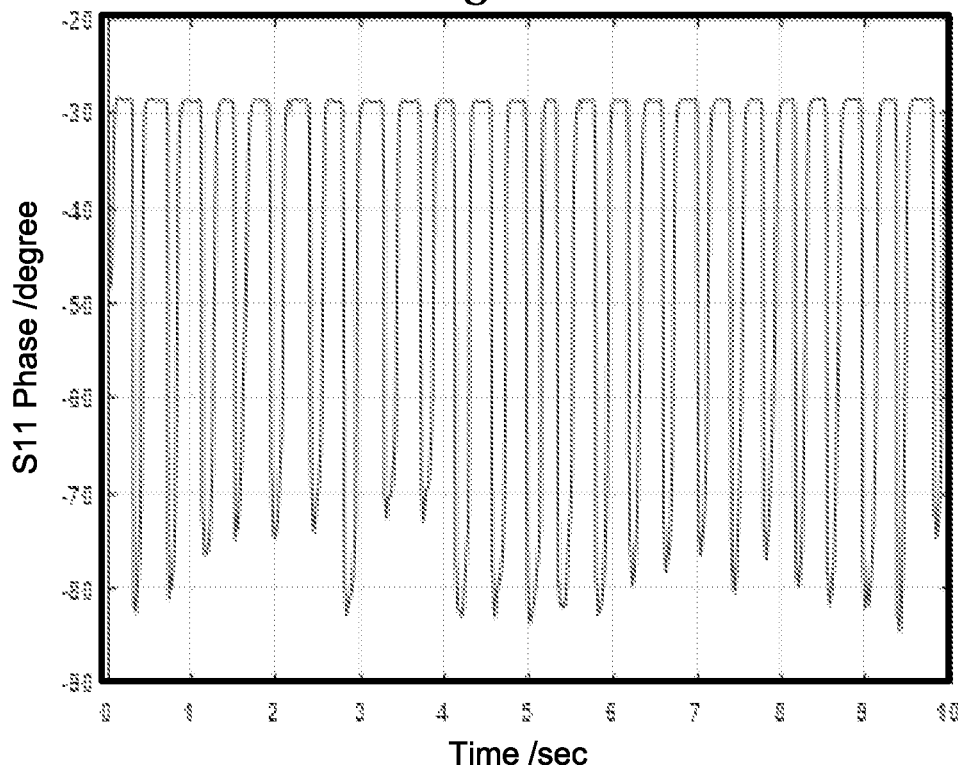
FIG. 11 shows the phase of a reflection coefficient (S11) signal having a particular pattern as a function of time resulting from a gesture made by a wearer's finger proximate an antenna of a hearing device in accordance with any of the embodiments disclosed herein.

Experiments were performed to demonstrate how the reflection coefficient, S11, changes with finger gestures in time and in frequency. In one experimental setup, a male subject sat in an anechoic chamber with a PIFA (Printed Inverted-F antenna) placed on his left ear. The antenna was connected to a Vector Network Analyzer (VNA, Keysight N5230C). The VNA was set to CW (continuous wave) mode. The subject held the cable using his right hand and tapped on the antenna periodically. FIG. 10 shows the measured S11 magnitude of the tapping motion in time domain at a frequency of 2.45 GHz. FIG. 11 shows the measured S11 phase of the tapping motion in the time domain at a frequency of 2.45 GHz.

FIGS. 10 and 11 demonstrate that both the magnitude and phase of S11 have a periodical pattern as a function of time, due to the perturbation of the electrical field of the antenna by the finger tapping gesture. This periodical pattern in S11 magnitude and S11 phase is representative of an S11 reference signature that corresponds to a finger tapping gesture. The measured S11 magnitude and phase can be measured as a function of time and at each frequency in a hopping sequence to generate a 2-D S11 reference signature that corresponds to the finger tapping gesture. This would produce S11 magnitude and phase patterns like those shown in FIGS. 10 and 11 for each frequency in the hopping sequence. Other gestures can be characterized in this manner to produce a multiplicity of 2-D S11 reference signatures indicative of a corresponding multiplicity of wearer gestures.

Figure 12A:
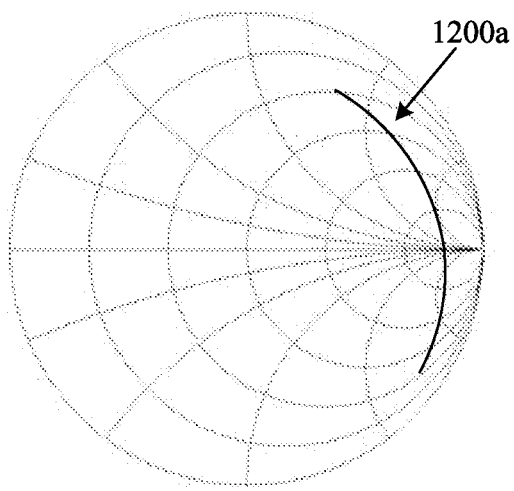
FIGS. 12A-12C are Smith charts showing that both the magnitude and phase of a reflection coefficient signal (S11) changes as a function of frequency as a finger is moved in proximity of the antenna.
Figure 12B:
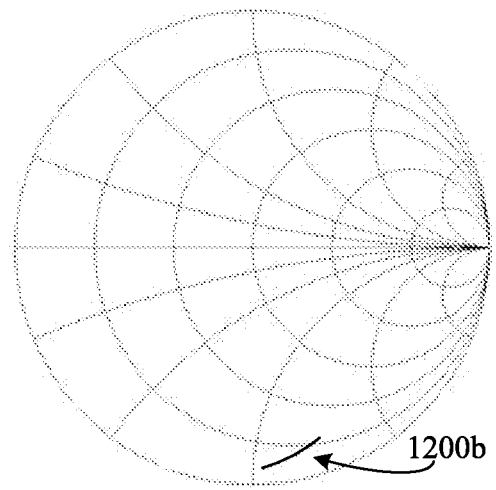
Figure 12C:
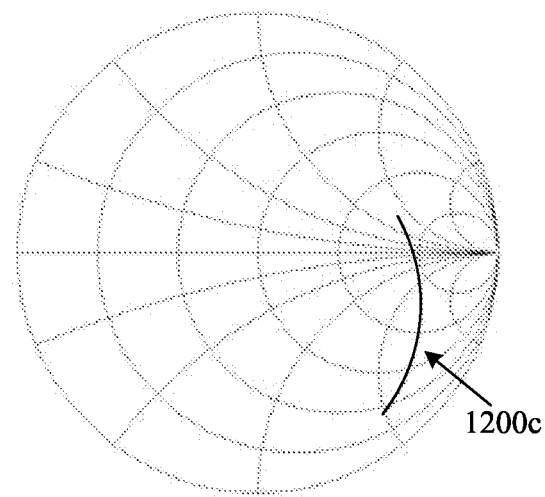

In another experimental setup, a PIFA antenna was placed in an ear of a phantom head. This experimental setup demonstrated how the S11 changes with finger gestures in the frequency domain. In the experiment, a human finger was touching the antenna directly and indirectly through a piece of paper. The results were measured using the VNA, and are illustrated in FIGS. 12A-12C, which show the measured complex S11 in the frequency domain at a single moment in time (quasi-static motion). FIG. 12A shows the measured complex S11 (curve 1200a) without a finger in proximity of the antenna. FIG. 12B shows the measured complex S11 (curve 1200b) with a finger touching the antenna directly. FIG. 12C shows the measured complex S11 (curve 1200c) with a finger touching the antenna indirectly through paper.

It can be seen in FIGS. 12A-12C that both the magnitude and phase of S11 change as the finger is moved in proximity of the antenna. The results demonstrate that the S11 varies in the frequency domain for different finger gestures. As in the previous experiment, the measured S11 magnitude and phase can be measured as a function of time and at each frequency in a hopping sequence to generate a 2-D S11 reference signature that corresponds to a particular finger gesture. This would produce S11 patterns like those shown in FIGS. 12A-12C for each frequency in the hopping sequence as a function of time. Other gestures can be characterized in this manner to produce a multiplicity of 2-D S11 reference signatures indicative of a corresponding multiplicity of wearer gestures.

Figure 13:
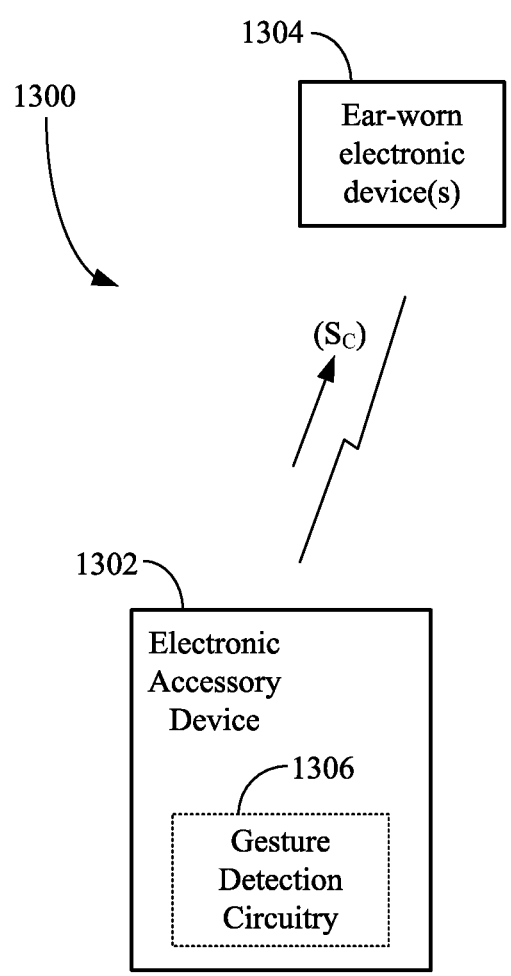
FIG. 13 illustrates a system which includes an electronic accessory device configured to wirelessly couple to an ear-worn electronic device or devices, the electronic accessory device configured to include gesture detection circuitry configured to implement a gesture detection method using FHSS transmission implemented in accordance with any of the embodiments disclosed herein.

Embodiments of the disclosure are generally directed to gesture detection and device control implemented in ear-worn electronic devices. It is understood that some embodiments are directed to systems comprising an electronic accessory device and an ear-worn electronic device(s). FIG. 13 illustrates a system 1300 which includes an electronic accessory device 1302 configured to wirelessly couple to an ear-worn electronic device or devices 1304. The electronic accessory device 1302 is configured to include gesture detection circuitry 1306, such as that shown in FIGS. 8 and 9. The gesture detection circuitry 1306 of the electronic accessory device 1302 is configured to implement a gesture detection method using FHSS transmission implemented in accordance with any of the embodiments disclosed herein.

The gesture detection circuitry 1306 is configured to detect an input gesture of a wearer of the ear-worn electronic device 1304 in accordance with any of the methodologies disclosed herein (e.g., see FIGS. 2-9). In response to detecting a particular input gesture, the electronic accessory device 1302 generates a control signal, $S_C$, which is communicated to the ear-worn electronic device 1304. In response to receiving the control signal, $S_C$, the ear-worn electronic device 1304 implements a device function corresponding to the wearer's input gesture (e.g., increase volume).

The electronic accessory device 1302 can take many forms including, but not limited to, fitness and/or health monitoring watches or other wrist worn or hand-held objects, e.g., Apple Watch®, Fitbit®, cell phones, smartphones, handheld radios, medical implants, hearing aid accessories, wireless capable helmets (e.g., used in professional football), and wireless headsets/headphones (e.g., virtual reality headsets). Each of these devices is represented by the system block diagram of FIGS. 1A, 1B, and/or 13, with the components of FIGS. 1A, 1B, and 13 varying depending on the particular device implementation.

Embodiments of the invention are defined in the claims. However, below there is provided a non-exhaustive listing of non-limiting examples. Any one or more of the features of these examples may be combined with any one or more features of another example, embodiment, or aspect described herein.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electromagnetic signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A method implemented by an ear-worn electronic device configured to be worn by a wearer and comprising a wireless transceiver operably coupled to an antenna, the method comprising:
   transmitting, from the transceiver to the antenna, signals at a plurality of different frequencies in accordance with a frequency hopping sequence;
   collecting two-dimensional (2-D) reflection coefficient data comprising a reflection coefficient of the antenna as a function of frequency and of time in response to transmission of the signals;
   detecting a particular input gesture of a plurality of input gestures of the wearer using the 2-D reflection coefficient data; and
   implementing a predetermined function of the ear-worn electronic device in response to detecting the particular input gesture.

2. The method of claim 1, wherein the collected 2-D reflection coefficient data defines variations in the reflection coefficient of the antenna as a function of frequency and of time due to perturbation of a field of the antenna in response to the particular input gesture.

3. The method of claim 1, wherein collecting the 2-D reflection coefficient data comprises measuring the reflection coefficient of the antenna for each frequency of the frequency hopping sequence and times at which each frequency of the frequency hopping sequence repeats.

4. The method of claim 1, wherein detecting the particular input gesture comprises comparing the collected 2-D reflection coefficient data to reference 2-D reflection coefficient data indicative of the plurality of input gestures.

5. The method of claim 4, wherein the reference 2-D reflection coefficient data is stored in a memory of the ear-worn electronic device.

6. The method of claim 4, wherein the reference 2-D reflection coefficient data is stored in a memory of an external server communicatively coupled to the ear-worn electronic device.

7. The method of claim 1, comprising:
producing a time-frequency spectrogram using the collected 2-D reflection coefficient data;
wherein detecting the particular input gesture comprises comparing the spectrogram to a plurality of reference spectrograms indicative of the plurality of input gestures.

8. The method of claim 1, comprising:
performing a Fast Fourier Transform or a continuous wavelet transform on the collected 2-D reflection coefficient data; and
detecting the particular input gesture from the plurality of input gestures using the transformed 2-D reflection coefficient data.

9. The method of claim 1, wherein the particular input gesture comprises a hand gesture, a finger gesture, or a head gesture.

10. The method of claim 1, comprising increasing reliability of the particular input gesture detection by:
collecting additional 2-D reflection coefficient data after collecting initial 2-D reflection coefficient data; and
detecting the particular input gesture using the additional 2-D reflection coefficient data;
wherein the predetermined function is implemented in response to detecting the particular input gesture using the initial and additional 2-D reflection coefficient data.

11. The method of claim 1, comprising:
generating a request perceivable by the wearer for a confirmation input prior to initiating the predetermined function; and
implementing the predetermined function in response to detecting the confirmation input provided by the wearer.

12. The method of claim 1, comprising:
detecting the particular input gesture using a sensor of the ear-worn electronic device; and
implementing the predetermined function of the ear-worn electronic device in response to detecting the particular input gesture using the 2-D reflection coefficient data and data produced by the sensor.

13. The method of claim 1, comprising implementing input gesture training using the ear-worn electronic device and an external device communicatively coupled to the ear-worn electronic device.

14. The method of claim 1, comprising:
performing input gesture detection during a fast time constant mode; and
performing impedance matching between the transceiver and the antenna during a slow time constant mode.

15. The method of claim 14, wherein:
the fast time constant mode involves a fast time constant that is shorter in duration than a duration of the particular input gesture; and
the slow time constant mode involves a slow time constant that has a duration longer than a plurality of frequency hopping sequences.

16. The method of claim 1, wherein at least the particular input gesture comprises a single gesture of the wearer or a multiplicity of gestures of the wearer.

17. An ear-worn electronic device configured to be worn by a wearer, comprising:
a housing configured to be supported at, by, in or on the wearer's ear;
a processor coupled to memory, the processor and memory disposed in the housing;
a speaker or a receiver operably coupled to the processor;
a radio frequency transceiver disposed in the housing and operably coupled to the processor;
an antenna disposed in, on, or extending from the housing and operably coupled to the transceiver; and
circuitry coupled to the antenna, transceiver, and processor, the circuitry configured to measure a reflection coefficient of the antenna, wherein the processor is configured to cooperate with the transceiver, antenna, and circuitry to:
transmit signals at a plurality of different frequencies to the antenna in accordance with a frequency hopping sequence;
collect two-dimensional (2-D) reflection coefficient data comprising the reflection coefficient of the antenna as a function of frequency and of time in response to transmission of the signals;
detect a particular input gesture of a plurality of input gestures of the wearer using the 2-D reflection coefficient data; and
implement a predetermined function of the ear-worn electronic device in response to detecting the particular input gesture.

18. The ear-worn electronic device of claim 17, wherein:
the circuitry comprises a bridge circuit configured to measure input impedance of the antenna; and
the processor is configured to obtain the reflection coefficient of the antenna from the bridge circuit.

19. The ear-worn electronic device of claim 17, wherein the circuitry comprises automatic antenna tuning and gesture detection circuitry.

20. The ear-worn electronic device of claim 17, wherein the circuitry comprises:
matching circuitry coupled to the antenna; and
registers configured to record forward and reflected voltages to and from the antenna;
wherein the processor is configured to measure the reflection coefficient of the antenna using the forward and reflected voltages.

21. The ear-worn electronic device of claim 17, wherein the processor is configured to:
implement input gesture detection using the circuitry during a fast time constant mode; and
implement impedance matching between the transceiver and the antenna using the circuitry during a slow time constant mode.

22. The ear-worn electronic device of claim 21, wherein:
the fast time constant mode involves a fast time constant that is shorter in duration than a duration of the particular input gesture; and
the slow time constant mode involves a slow time constant that has a duration longer than a plurality of frequency hopping sequences.

23. The ear-worn electronic device of claim 17, wherein at least the particular input gesture comprises a single gesture of the wearer.

24. The ear-worn electronic device of claim 17, wherein at least the particular input gesture comprises a multiplicity of gestures of the wearer.

\* \* \* \* \*